(12) United States Patent
Nakayama et al.

(10) Patent No.: US 11,557,754 B2
(45) Date of Patent: Jan. 17, 2023

(54) POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Tetsuri Nakayama, Toyota (JP); Kenji Takamori, Tsukuba (JP); Kyousuke Doumae, Fukui (JP); Takashi Kitamoto, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 0 days.

(21) Appl. No.: 15/113,679

(22) PCT Filed: Jan. 26, 2015

(86) PCT No.: PCT/JP2015/051992
§ 371 (c)(1),
(2) Date: Jul. 22, 2016

(87) PCT Pub. No.: WO2015/111740
PCT Pub. Date: Jul. 30, 2015

(65) Prior Publication Data
US 2016/0380263 A1  Dec. 29, 2016

(30) Foreign Application Priority Data

Jan. 27, 2014  (JP) .............................. JP2014-012835

(51) Int. Cl.
*H01M 4/36* (2006.01)
*H01M 4/505* (2010.01)
(Continued)

(52) U.S. Cl.
CPC ........... *H01M 4/366* (2013.01); *H01M 4/505* (2013.01); *H01M 4/525* (2013.01); *H01M 4/62* (2013.01);
(Continued)

(58) Field of Classification Search
None
See application file for complete search history.

(56) References Cited

U.S. PATENT DOCUMENTS

| 6,447,958 B1 | 9/2002 | Shinohara et al. |
| 2002/0053663 A1 | 5/2002 | Ito et al. |

(Continued)

FOREIGN PATENT DOCUMENTS

| CN | 1224537 A | 7/1999 |
| CN | 100338801 C | 9/2007 |

(Continued)

OTHER PUBLICATIONS

International Search Report for PCT/JP2015/051992 dated Apr. 28, 2015.
(Continued)

*Primary Examiner* — Tracy M Dove
(74) *Attorney, Agent, or Firm* — Sughrue Mion, PLLC

(57) ABSTRACT

A positive electrode active material for a lithium secondary battery, comprising a lithium-containing composite metal oxide in the form of secondary particles formed by aggregation of primary particles capable of being doped and undoped with lithium ions, each of the secondary particles having on its surface a coating layer, the positive electrode active material satisfying the following requirements (1) to (3):

(Continued)

(1) the metal oxide has an α-NaFeO₂ type crystal structure of following formula (A):

$$Li_a(Ni_bCo_cM^1{}_{1-b-c})O_2 \qquad (A)$$

wherein $0.9 \leq a \leq 1.2$, $0.9 \leq b < 1$, $0 < c \leq 0.1$, $0.9 < b+c \leq 1$, and $M^1$ represents at least one optional metal selected from Mg, Al, Ca, Sc, Ti, V, Cr, Mn, Fe, Cu, Zn, Ga, Ge, Sr, Y, Zr, Nb, Mo, Tc, Ru, Rh, Pd, Ag, Cd, In and Sn;
(2) the coating layer comprises Li and $M^2$, wherein $M^2$ represents at least one optional metal selected from Al, Ti, Zr and W; and
(3) the active material has an average secondary particle diameter of 2 to 20 μm, a BET specific surface area of 0.1 to 2.5 m²/g, and a value of 1.0 to 2.0 as a tamped density/untamped density ratio of the active material.

8 Claims, 1 Drawing Sheet

(51) Int. Cl.
| | | |
|---|---|---|
| *H01M 4/525* | (2010.01) | |
| *H01M 4/62* | (2006.01) | |
| *H01M 10/0525* | (2010.01) | |
| *H01M 10/052* | (2010.01) | |
| *H01M 10/0587* | (2010.01) | |
| *H01M 4/02* | (2006.01) | |

(52) U.S. Cl.
CPC ...... *H01M 10/0525* (2013.01); *H01M 10/052* (2013.01); *H01M 10/0587* (2013.01); *H01M 2004/021* (2013.01); *H01M 2004/028* (2013.01); *H01M 2220/20* (2013.01); *H01M 2220/30* (2013.01)

(56) References Cited

U.S. PATENT DOCUMENTS

| | | | |
|---|---|---|---|
| 2002/0142224 | A1 | 10/2002 | Kweon et al. |
| 2007/0009797 | A1 | 1/2007 | Takami et al. |
| 2009/0035659 | A1 | 2/2009 | Takeuchi et al. |
| 2009/0305136 | A1* | 12/2009 | Yada ............... H01M 4/0471 429/223 |
| 2009/0314984 | A1 | 12/2009 | Sasaki et al. |
| 2010/0047691 | A1 | 2/2010 | Kawakami |
| 2010/0316910 | A1 | 12/2010 | Kajiyama et al. |
| 2012/0077083 | A1 | 3/2012 | Kageura et al. |
| 2012/0156565 | A1* | 6/2012 | Kim ............... H01M 4/0471 429/221 |
| 2014/0225031 | A1 | 8/2014 | Yasuda et al. |

FOREIGN PATENT DOCUMENTS

| | | |
|---|---|---|
| CN | 101308925 A | 11/2008 |
| CN | 101997113 A | 3/2011 |
| CN | 102709548 A | 10/2012 |
| CN | 102832389 A | 12/2012 |
| EP | 1 624 509 A1 | 2/2006 |
| EP | 1879248 A1 | 1/2008 |
| EP | 2012380 A2 | 1/2009 |
| JP | 10-324758 A | 12/1998 |
| JP | 2000-30686 A | 1/2000 |
| JP | 2000-306577 A | 11/2000 |
| JP | 2000-515300 A | 11/2000 |
| JP | 2002-201028 A | 7/2002 |
| JP | 2003-017056 A | 1/2003 |
| JP | 2006-12433 A | 1/2006 |
| JP | 2007-103141 A | 4/2007 |
| JP | 2009-137834 A | 6/2009 |
| JP | 2010-129471 A | 6/2010 |
| JP | 2011-216272 A | 10/2011 |
| JP | 2012-109166 A | 6/2012 |
| JP | 2012-209064 A | 10/2012 |
| JP | 2013-75773 A | 4/2013 |
| JP | 2013-144625 A | 7/2013 |
| JP | 2013-206616 A | 10/2013 |
| JP | 2013-235786 A | 11/2013 |
| WO | 97/49136 A1 | 12/1997 |
| WO | 2004/102702 A1 | 11/2004 |
| WO | 2008056021 A2 | 5/2008 |
| WO | 2008/117683 A1 | 10/2008 |
| WO | 2011/007751 A1 | 1/2011 |

OTHER PUBLICATIONS

Tan Kim Han, Roslina Ahmad, Mohd Rafie Johan, "Phase, thermal and impedance studies of nanosize Li₂WO₄ via mechanical milling and sintering", Superlattices and Microstructures, 2011, vol. 49, p. 17-31 (15 pages total).
Romakanta Padhy, S.K.S Parashar, Nagamalleswara Rao A, Paritosh Chaudhuri, "Negative Temperature Coefficient of Resistance (NTCR) Effect of Nano Li₂TiO₃", International Journal of Pure and Applied Research in Engineering and Technology, 2013, vol. 1, No. 8, pp. 210-219 (10 pages total).
Communication dated Jan. 17, 2018 from the State Intellectual Property Office of the P.R.C. in counterpart Application No. 201580005706.X.
Communication dated May 29, 2017 from the European Patent Office in counterpart Application No. 15740333.8.
Notice of Duplicate of Opposition dated Jun. 22, 2017 from the Japanese Patent Office in counterpart Application No. 2015-559157 (Patent No. 6026679).
Notice of Reasons of Cancellation dated Jul. 14, 2017 from the Japanese Patent Office in counterpart Application No. 2015-559157 (Patent No. 6026679).
Communication dated Nov. 30, 2018, from the State Intellectual Property Office of People's Republic of China in counterpart Application No. 201580005706.X.
Communication dated Jul. 2, 2019 from the State Intellectual Property Office of the P.R.C. in application No. 201580005706.X.
Seung-Taek Myung et al., "Role of Alumina Coating on Li—Ni—Co—Mn—O Particles as Positive Electrode Material for Lithium-Ion Batteries", Chem. Mater., Jun. 15, 2005, vol. 17, No. 14, pp. 3695-3704 (10 pages total).
Qiang Liu et al., "Structural and electrochemical properties of Co-Mn-Mg multi-doped nickel based cathode materials LiNi₀.₉Co₀.₁₋ₓ[Mn_{frax;1;2}Mg_{frax;1;2}]ₓ O₂ for secondary lithium ion batteries", Electrochimica Acta, 2013, vol. 90, pp. 350-357(8 pages total).
Hyun-Soo Kim et al., "Enhanced electrochemical properties of LiNi₁/₃Co₁/₃Mn₁/₃O₂ cathode material by coating with LiAlO₂ nanoparticles", Journal of Power Sources, 2006, , vol. 161, pp. 623-627 (5 pages total).
Communication dated Apr. 5, 2019, from the European Patent Office in counterpart European Application No. 15740333.8.
Communication dated Aug. 4, 2020, from the State Intellectual Property Office of the P.R.C in application No. 201580005706.X.
Communication dated Jul. 14, 2020, from the State Intellectual Property Office of the P.R.C in application No. 201910992019.1.
Communication dated Jul. 1, 2020, issued by the Korean Intellectual Property Office in Korean Application No. 10-2016-7019841.
"Hausner Ratio", Wikipedia, Aug. 16, 2019, 2 pages, http://en.wikipedia.org/wiki/Hausner_ratio.
Communication dated Jan. 28, 2020 from the European Patent Office in application No. 15740333.8.
Grey, R. O., et al., "On the Hausner Ratio and its Relationship to Some Properties of Metal Powders", Department of Industrial and Management Engineering, Powder Technology, vol. 2, Jan. 28, 1969, pp. 323-326.
Kenji Takamori, "Technical Report: Effect of the tamped density/untamped density", Aug. 7, 2019, pp. 1-6.
Dr. Fiona Coomer, "Annex 1—Test Report—Determination of the presence or absence of lithium in the coating layer of Example 5 of D1 (CN101308925A)", Johnson Matthey PLC, Jun. 25, 2020, pp. 1-4 (4 pages).

(56) References Cited

OTHER PUBLICATIONS

Excerpt NIST XPS database, Jul. 21, 2020, pp. 1-2 (2 pages total).
J. Theo Kloprogge et al., "PS study of the major minerals in bauxite: Gibbsite, bayerite and (pseudo-)boehmite", Journal of Colloid and Interface Science, vol. 296, 2006, pp. 572-576 (5 pages total).
Communication dated Oct. 8, 2020 from the European Patent Office in Application No. 15 740 333.8.
Notice of Final Rejection dated Sep. 22, 2020 from the Korean Intellectual Property Office in Machine application No. 10-2016-7019841 Translation.
Dr. Fiona Coomer, "Annex 1—Test Report—Determination of the presence or absence of lithium in the coating layer of Example 5 of D1 (CN10308925A)", Johnson Matthey PLC, Jun. 25, 2020, pp. 1-4 (4 pages).
Communication dated Feb. 3, 2021, from The State Intellectual Property Office of the P.R. of China in Application No. 201910992019.1.
"Lithium Batteries Science and Technology", Edited by G.-A. Nazri and G. Pistoia,, Springer, published Jan. 14, 2009, pp. 10, 431-435, 438-441 (13 pages total).
S. Oh et al, "Effect of $Al_2O_3$ coating on electrochemical performance of $LiCoO_2$ as cathode materials for secondary lithium batteries", J. Power Sources, vol. 132 (2004), pp. 249-255 (7 pages total).
J. Cho et al, "Novel $LiCoO_2$ Cathode Material with $Al_2O_3$ Coating for a Li Ion Cell", Chem. Mater., vol. 12 (2000), pp. 3788-3791 (4 pages total).
"S.3.6. Bulk Density and Tapped Density of Powders", Final text for addition to The International Pharmacopoeia, WHO, Mar. 2012, pp. 1-6 (6 pages total).
"Standard Test Methods for Determining Loose and Tapped Bulk Densities of Powders using a Graduated Cylinder", ASTM D7481-18, Jun. 1, 2018, pp. 1-4 (4 pages total).
Statement of Grounds of Appeal dated Nov. 5, 2021 from the European Patent Office in EP Application No. 15740333.8.

\* cited by examiner

POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS REFERENCE TO RELATED APPLICATIONS

This application is a National Stage of International Application No. PCT/JP2015/051992 filed Jan. 26, 2015, claiming priority based on Japanese Patent Application No. 2014-012835 filed Jan. 27, 2014, the contents of all of which are incorporated herein by reference in their entirety.

TECHNICAL FIELD

The present invention relates to a positive electrode active material for a lithium secondary battery, a positive electrode for a lithium secondary battery and a lithium secondary battery.

Priority is claimed on Japanese Patent Application No. 2014-012835, filed Jan. 27, 2014, the contents of which are incorporated herein by reference.

BACKGROUND ART

Lithium-containing composite metal oxides are used as positive electrode active materials for lithium secondary batteries. Lithium secondary batteries have already been put to practical use as compact power supplies for portable telephones, notebook computers and the like. Further, the applications of lithium secondary batteries in medium- and large-sized power supplies for automobile use, electric power storage use, etc. have also been attempted. Especially, many studies have been made on a lithium-nickel composite oxide which has a large discharge capacity. The lithium-nickel composite oxide on one hand has such a large discharge capacity, but on the other hand the heat stability thereof during charging is inferior to other lithium-containing composite oxides, such as a lithium-cobalt composite oxide.

Therefore, as a conventional positive electrode active material for a lithium secondary battery, for example, Patent Document 1 describes a technique where the surface of the lithium-nickel composite oxide is coated with a layer of a lithium-manganese composite oxide or the like, the composition of which is varied depending on the positions, so as to improve the thermal stability during charging.

DOCUMENTS OF RELATED ART

Patent Documents

Patent Document 1: Japanese Unexamined Patent Application Publication No. 2009-137834

SUMMARY OF THE INVENTION

Problems to be Solved by the Invention

However, with a lithium secondary battery using the aforementioned conventional lithium-containing composite metal oxide as a positive electrode active material, a required high power output cannot be achieved when the battery is used for applications requiring high power output at high current rate, e.g., for applications to automobile or power tool such as electric tool.

The present invention has been made in view of the above situation, and the object of the present invention is to provide a positive electrode active material for a lithium secondary battery capable of higher power output at high current rate than the conventional lithium secondary batteries by regulating the composition and particle formation of the lithium-containing composite metal oxide and further forming a coating layer on the particles of the lithium-containing composite metal oxide. Further, the other objects of the present invention are to provide a positive electrode for a lithium secondary battery using such a positive electrode active material, and to provide a lithium secondary battery using such a positive electrode active material.

Means to Solve the Problems

For solving the aforementioned problems, the present invention in one aspect thereof provides a positive electrode active material for a lithium secondary battery, comprising a lithium-containing composite metal oxide in the form of secondary particles formed by aggregation of primary particles capable of being doped and undoped with lithium ions, each of the secondary particles having on its surface a coating layer, the positive electrode active material satisfying the following requirements (1) to (3):

(1) the lithium-containing composite metal oxide has an α-NaFeO$_2$ type crystal structure represented by the following formula (A):

$$Li_a(Ni_bCo_cM^1{}_{1-b-c})O_2 \qquad (A)$$

wherein $0.9 \leq a \leq 1.2$, $0.9 \leq b < 1.0 < c \leq 0.1$, $0.9 < b+c \leq 1$, and $M^1$ represents at least one optional metal selected from the group consisting of Mg, Al, Ca, Sc, Ti, V, Cr, Mn, Fe, Cu, Zn, Ga, Ge, Sr, Y, Zr, Nb, Mo, Tc, Ru, Rh, Pd, Ag, Cd, In and Sn;

(2) the coating layer comprises Li and $M^2$, wherein $M^2$ represents at least one optional metal selected from the group consisting of Al, Ti, Zr and W; and (3) the positive electrode active material has an average secondary particle diameter of 2 μm to 20 μn, a BET specific surface area of 0.1 m$^2$/g to 2.5 m$^2$/g, and a value of 1.0 to 2.0 as obtained by dividing a tamped density of the positive electrode active material by the untamped density of the positive electrode active material.

In one embodiment of the present invention, $M^1$ is preferably at least one metal selected from the group consisting of Mg, Al, Ca, Ti, Mn, Zn, Ga, Zr and Sn, and is more preferably at least one metal selected from the group consisting of Mg, Al, Mn, Zn and Sn.

In one embodiment of the present invention, the positive electrode active material preferably has a tamped density of 1.0 g/cm$^3$ to 3.5 g/cm$^3$.

In one embodiment of the present invention, it is preferable that a value of [90% cumulative diameter ($D_{90}$)/10% cumulative diameter ($D_{10}$)] as obtained from the particle size distribution measurement values is 1 to 5.

In one embodiment of the present invention, it is preferable that an atomic ratio of $M^2$ is 0.1 to 5 mol %, relative to the sum of atomic ratios of Ni, Co and $M^1$.

In one embodiment of the present invention, $M^2$ is preferably Al.

In one embodiment of the present invention, the coating layer is preferably formed of lithium aluminate.

The present invention in another aspect thereof provides a positive electrode for a lithium secondary battery, comprising the aforementioned positive electrode active material.

The present invention in still another aspect thereof provides a lithium secondary battery, comprising a negative electrode and the aforementioned positive electrode.

Effect of the Invention

The present invention can provide a positive electrode active material for a lithium secondary battery capable of higher power output at high current rate than the conventional lithium secondary batteries. Further, the present invention can also provide a positive electrode for a lithium secondary battery using such a positive electrode active material, and provide a lithium secondary battery using such a positive electrode active material.

EMBODIMENTS FOR CARRYING OUT THE INVENTION

Figure 1A:
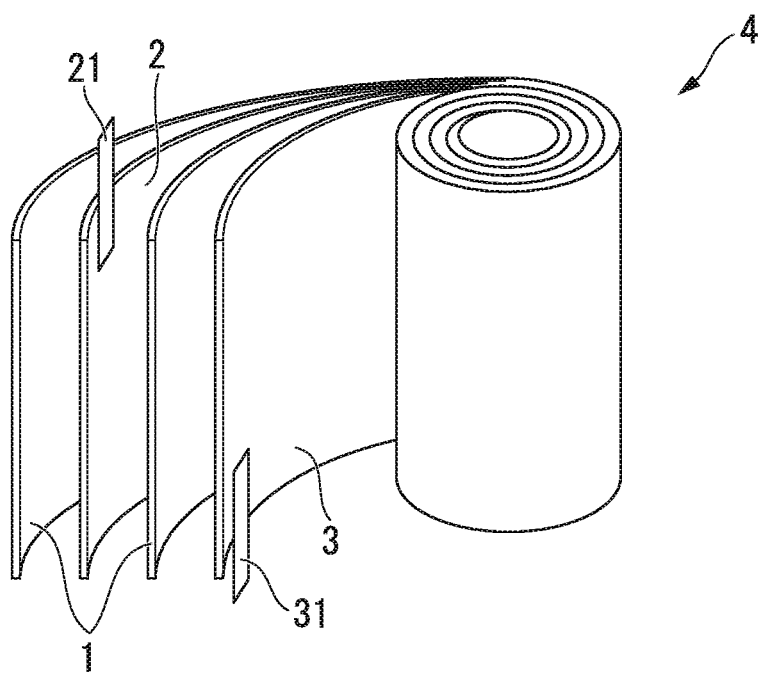
FIG. 1A is a schematic view showing one example of the lithium secondary battery.

[Positive Electrode Active Material for Lithium Secondary Battery]

The positive electrode active material for a lithium secondary battery according to the present embodiment comprises a lithium-containing composite metal oxide in the form of secondary particles formed by aggregation of primary particles capable of being doped and undoped with lithium ions, each of the secondary particles having on its surface a coating layer, the positive electrode active material satisfying the following requirements (1) to (3):

(1) the lithium-containing composite metal oxide has an α-NaFeO₂ type crystal structure represented by the following formula (A):

$$Li_a(Ni_bCo_cM^1_{1-b-c})O_2 \quad (A)$$

wherein $0.9 \leq a \leq 1.2$, $0.9 \leq b < 1$, $0 < c \leq 0.1$, $0.9 < b+c \leq 1$, and $M^1$ represents at least one optional metal selected from the group consisting of Mg, Al, Ca, Sc, Ti, V, Cr, Mn, Fe, Cu, Zn, Ga, Ge, Sr, Y. Zr, Nb, Mo, Tc, Ru, Rh, Pd, Ag, Cd, In and Sn;

(2) the coating layer comprises Li and $M^2$, wherein $M^2$ represents at least one optional metal selected from the group consisting of Al, Ti, Zr and W; and (3) the positive electrode active material has an average secondary particle diameter of 2 μm to 20 μm, a BET specific surface area of 0.1 m²/g to 2.5 m²/g, and a value of 1.0 to 2.0 as obtained by dividing a tamped density of the positive electrode active material by the untamped density of the positive electrode active material.

Hereinbelow, detailed explanations will be made on the positive electrode active material for a lithium secondary battery according to the present embodiment.

(Lithium-Containing Composite Metal Oxide)

The positive electrode active material for a lithium secondary battery according to the present embodiment is composed of a lithium-containing composite metal oxide forming a core, and a coating layer covering the core.

Firstly, the crystal structure of the lithium-containing composite metal oxide in the present embodiment is a layered structure of α-NaFeO₂ type, and is more preferably a hexagonal crystal structure or a monoclinic crystal structure.

The hexagonal crystal structure belongs to any one of the space group selected from the group consisting of P3, P3₁, P3₂, R3, P-3, R-3, P312, P321, P3₁12. P3₁21, P3₂12, P3₂21, R32. P3 ml, P31m, P3c1, P31c. R3m, R3c. P-31m, P-31c, P-3 ml, P-3c1, R-3m, R-3c, P6, P6₁, P6₅, P6₂, P6₄, P6₃, P-6, P6/m, P6₃/m, P622, P6₁22, P6₅22, P6₂22, P6₄22, P6₃22, P6 mm, P6cc, P6₃ cm, P6₃mc, P-6m2, P-6c2. P-62m, P-62c, P6/mmm, P6/mcc, P6₃/mcm, and P6₃/mmc.

The monoclinic crystal structure belongs to any one of the space group selected from the group consisting of P2, P2₁. C2, Pm, Pc, Cm, Cc, P2/m, P2₁/m, C2/m, P2/c, P2₁/c, and C2/c.

Among the aforementioned crystal structures, since the discharge capacity of the obtained lithium secondary battery increases, the particularly preferable crystal structure of the positive electrode active material is a hexagonal crystal structure belonging to R-3m or a monoclinic crystal structure belonging to C2/m.

The space group of the lithium-containing composite metal oxide in the present embodiment can be confirmed by the following method.

First, the powder X-ray diffraction measurement is performed with respect to the positive electrode active material for a lithium secondary battery, wherein Cu-Kα is used as a radiation source and the measurement range of a diffraction angle 2θ is set in a range of 10° to 900, subsequently, Rietveld analysis is performed on the basis of the result (the obtained powder X-ray diffraction pattern), and the crystal structure possessed by the lithium-containing composite metal oxide and the space group in the crystal structure are determined. The Rietveld analysis is a method in which the crystal structure of a material is analyzed using the data of diffraction peaks (diffraction peak intensity and diffraction angle 2θ) in the powder X-ray diffraction measurement of the material, which has been conventionally used (for example, refer to "Practice of powder X-ray analysis-Introduction to the Rietveld method" published on Feb. 10, 2002, and edited by Conference for X-ray analysis in The Japan Society for Analytical Chemistry).

In the α-NaFeO₂ type crystal structure represented by the formula (A), a is within the range of $0.9 \leq a \leq 1.2$. For improving the effects of the present invention, a is preferably within the range of $0.95 \leq a \leq 1.2$, more preferably $0.96 \leq a \leq 1.15$, still more preferably $0.97 \leq a \leq 1.1$, and most preferably $0.98 \leq a \leq 1.05$.

In the α-NaFeO₂ type crystal structure represented by the formula (A), b is within the range of $0.9 \leq b < 1$. For improving the effects of the present invention, b is preferably within the range of $0.9 \leq b \leq 0.98$, more preferably $0.9 \leq b \leq 0.95$, and still more preferably $0.9 \leq b \leq 0.92$.

In the α-NaFeO₂ type crystal structure represented by the formula (A), c is within the range of $0 < c \leq 0.1$. For improving the effects of the present invention, c is preferably within the range of $0 < c \leq 0.09$, more preferably $0.01 \leq c \leq 0.08$, still more preferably $0.02 \leq c \leq 0.07$, and most preferably $0.03 \leq c \leq 0.06$. Further, b+c is within the range of $0.9 < b+c \leq 1$, preferably $0.9 < b+c < 1$, more preferably $0.92 \leq b+c < 1$, and still more preferably $0.93 \leq b+c < 1$.

In the positive electrode active material for a lithium secondary battery of the present embodiment, $M^1$ represents at least one optional metal selected from the group consisting of Mg, Al, Ca. Sc, Ti, V, Cr, Mn, Fe, Cu, Zn, Ga, Ge, Sr, Y, Zr, Nb, Mo, Tc, Ru, Rh, Pd, Ag, Cd, In and Sn, preferably at least one optional metal selected from the group consisting of Mg. Al, Ca. Ti. Mn. Zn, Ga. Zr and Sn, still more preferably at least one optional metal selected from the group consisting of Mg, Al, Mn, Zn and Sn, and still more preferably at least one optional metal selected from the group consisting of Mg, Al and Mn.

(Coating Layer)

The coating layer comprises a metal composite oxide of Li and $M^2$. $M^2$ represents at least one metal selected from the group consisting of Al, Ti, Zr and W, and preferably Al. The coating layer is preferably formed of lithium aluminate, and more preferably α-lithium aluminate.

In the present embodiment, the coating layer may further comprise at least one metal selected from the group consisting of Mn, Fe, Co and Ni.

For improving the effects of the present invention, the atomic ratio of $M^2$ in the coating layer relative to the sum of atomic ratios of Ni, Co and $M^1$ in the lithium-containing composite metal oxide (atomic ratio of M2/(atomic ratio Ni+atomic ratio of Co+atomic ratio of M1)×100) is preferably 0.1 to 5 mol %, more preferably 0.1 to 3 mol %, and still more preferably 1 to 3 mol %.

In the present embodiment, the confirmation of the composition of the coating layer can be carried out by analyzing the cross-section of the secondary particles by STEM-EDX elemental line analysis, inductively coupled plasma atomic emission spectrophotometry, electron probe microanalysis and the like. The confirmation of the crystal structure of the coating layer can be carried out by powder X-ray diffraction, electron beam diffraction and the like.

(Particle Diameter)

As to the form of particles of the positive electrode active material for a lithium secondary battery of the present embodiment, the positive electrode active material is in the form of secondary particles formed by aggregation of primary particles. In the present embodiment, for improving the effects of the present invention, the average primary particle diameter is preferably 0.1 μm to 2.0 μm, more preferably 0.1 μm to 1.5 μm, and still more preferably 0.1 μm to 1.0 μn. The average primary particle diameter can be measured by the SEM observation.

The average secondary particle diameter of the secondary particles formed by aggregation of primary particles is preferably 2 μm to 20 μm. For improving the effects of the present invention, the average secondary particle diameter is more preferably 2 μm to 15 μm, and still more preferably 5 μm to 15 μm.

In the present embodiment, the "average secondary particle diameter" of the positive electrode active material for a lithium secondary battery indicates a value measured by the following method (laser diffraction scattering method).

First, 0.1 g of a powder of the positive electrode active material for a lithium secondary battery was added to 50 ml of 0.2 wt % aqueous solution of sodium hexametaphosphate, thereby obtaining a dispersion with the powder dispersed therein. The obtained dispersion was subjected to a particle size distribution measurement using a laser scattering particle size distribution measuring apparatus (Mastersizer MS2000, manufactured by Malvern Instruments Ltd.), whereby the volume-based particle size distribution was measured. From the obtained cumulative particle size distribution curve, the particle diameter ($D_{50}$) at a 50% cumulation measured from the smallest particle side is determined as the average secondary particle diameter of the positive electrode active material for a lithium secondary battery. Similarly, the particle diameter ($D_{10}$) at a 10% cumulation measured from the smallest particle side is determined as the 10%0/cumulative diameter, and the particle diameter ($D_{90}$) at a 90% cumulation measured from the smallest particle side is determined as the 90% cumulative diameter.

(BET Specific Surface Area)

The BET specific surface area of the positive electrode active material for a lithium secondary battery of the present embodiment is in a range of 0.1 $m^2$/g to 2.5 $m^2$/g. For improving the energy density of the lithium secondary battery, the BET specific surface area is preferably 0.1 $m^2$/g to 1.5 $m^2$/g, still more preferably 0.2 $m^2$/g to 0.6 $m^2$/g.

(Tamped Density, Untamped Density)

In the positive electrode active material for a lithium secondary battery of the present embodiment, the value obtained by dividing a tamped density thereof by an untamped density thereof is 1.0 to 2.0. For improving the effects of the present invention, the value is preferably 1.1 to less than 2.0, more preferably 1.2 to 1.9, and still more preferably 1.2 to 1.8.

The tamped density is preferably 1.0 $g/cm^3$ to 3.5 $g/cm^3$, more preferably 2.0 $g/cm^3$ to 3.0 $g/cm^3$, and still more preferably 2.2 $g/cm^3$ to 2.7 $g/cm^3$.

The untamped density is 0.5 $g/cm^3$ to 2.4 $g/cm^3$, more preferably 1.4 $g/cm^3$ to 2.2 $g/cm^3$, still more preferably 1.5 $g/cm^3$ to 2.1 $g/cm^3$, and especially preferably 1.6 $g/cm^3$ to 2.0 $g/cm^3$.

Here, the tamped density corresponds to the tapped bulk density in accordance with JIS R 1628:1997, and the untamped density corresponds to the initial stage bulk density in accordance with JIS R 1628:1997.

(Particle Size Distribution)

For improving the effects of the present invention, the positive electrode active material for a lithium secondary battery of the present embodiment preferably has a particle size distribution such that a value of [90% cumulative diameter ($D_{90}$)/10% cumulative diameter ($D_{10}$)] as obtained from the particle size distribution measurement values is 1 to 5. The value is more preferably more than 1 to 4, still more preferably 1.1 to 3, especially preferably 1.3 to 2.5, and most preferably 1.5 to 2.3.

(Diffraction Peak Intensity Ratio)

When the positive electrode active material for a lithium secondary battery of the present embodiment has a powder X-ray diffraction (XRD) pattern ascribed to a space group of R-3m, for improving the effects of the present invention, the intensity ratio of the (003) peak to the (104) peak in the XRD pattern is preferably 1 to 10, more preferably 1.2 to 5, and still more preferably 1.6 to 3.

Further, the positive electrode active material for a lithium secondary battery of the present embodiment may be mixed with other active materials as long as the effects of the present embodiment are not impaired.

[Method for Producing Lithium-Containing Composite Metal Oxide]

In the present embodiment, for producing the lithium-containing composite metal oxide, it is preferred to first prepare a metal composite compound containing metals other than lithium, i.e., Ni and Co, and at least one optional metal selected from the group consisting of Mg, Al, Ca, Sc, Ti. V, Cr, Mn, Fe, Cu, Zn, Ga, Ge. Sr, Y, Zr, Nb, Mo, Tc, Ru, Rh, Pd, Ag, Cd, In and Sn, and then calcine the metal composite compound with a suitable lithium salt. As the metal composite compound, it is preferable to use a metal composite hydroxide or a metal composite oxide. Hereinbelow, as to one example of the method for producing the lithium-containing composite metal oxide, explanations are made separately on the step of producing the metal composite compound and the step of producing the lithium-containing composite metal oxide.

(Step of Producing Metal Composite Compound)

The metal composite compound can be produced by the conventionally known batch method or co-precipitation method.

Hereinbelow, the method for producing the metal composite compound is explained taking as an example the case of production of a metal composite hydroxide containing nickel, cobalt and manganese as metals.

First, a nickel salt solution, a cobalt salt solution, a manganese salt solution and a complexing agent are reacted by the co-precipitation method, especially, a continuous method described in Japanese Patent Unexamined Publication No. 2002-201028 to produce a metal composite hydroxide represented by $Ni_xCo_yMn_z(OH)_2$, wherein $x+y+Z=1$.

There is no particular limitation with respect to a nickel salt as a solute in the aforementioned nickel salt solution. For example, any of nickel sulfate, nickel nitrate, nickel chloride and nickel acetate can be used. As a cobalt salt as a solute in the cobalt salt solution, for example, any of cobalt sulfate, cobalt nitrate and cobalt chloride can be used. As a manganese salt as a solute in the manganese salt solution, for example, any of manganese sulfate, manganese nitrate and manganese chloride can be used. These metal salts are used in a ratio corresponding to the composition ratio of the aforementioned $Ni_xCo_yMn_z(OH)_2$. As a solvent, water can be used.

The complexing agent is a substance capable of forming a complex with ions of nickel, cobalt and manganese in an aqueous solution, the examples of which include an ammonium ion donor (ammonium sulfate, ammonium chloride, ammonium carbonate, ammonium fluoride, etc.), hydrazine, ethylenediaminetetraacetic acid, nitrilotriacetic acid, uracil diacetate and glycine.

For adjusting the pH value of the aqueous solution during the precipitation, if necessary, an alkali metal hydroxide (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of $Ni_xCo_yMn_z(OH)_2$. The reaction is performed with the temperature in the reaction vessel being regulated, for example, within the range of 10° C. to 60° C., preferably 20° C. to 60° C. and the pH value in the reaction vessel being regulated, for example, within the range of 9 to 13, preferably 10 to 13, while appropriately agitating the content of the reaction vessel. With respect to the reaction vessel, one which allows the overflow for separation of the precipitated reaction product can be used.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting may be washed with weak acid water. In the above example, a nickel-cobalt-manganese composite hydroxide is produced; however, a nickel-cobalt-manganese composite oxide may be produced instead.

By regulating conditions such as the reaction temperature, the reaction pH, and the calcination conditions to fall within the respective ranges as described below, it becomes possible to control various physical properties (such as average primary particle diameter, average secondary particle diameter, and BET specific surface area) of the positive electrode active material for a lithium secondary battery obtained as the end product in the process described below. Especially for controlling the value obtained by dividing the tamped density by the untamped density to fall within a preferred range, for example, it is preferable to adjust the conditions such that the metal composite hydroxide is to have a morphology of spherical secondary particles. As another method for realizing a desired particle morphology, there can be mentioned a method which employs a bubbling with various gases such as inert gases (e.g., nitrogen, argon and carbon dioxide), air and oxygen, as well as the choice of the aforementioned conditions. The reaction conditions can be optimized by monitoring the various physical properties of the final positive active material for a lithium secondary battery to be obtained in consideration of the above conditions, though optimal reaction conditions may vary depending on the size of the reaction vessel used, etc.

(Step of Producing Lithium-Containing Composite Metal Oxide)

After drying the metal composite oxide or the metal composite hydroxide, the dried product is mixed with a lithium salt.

The drying conditions are not particularly limited, and may be, for example, any of the following conditions: conditions under which the metal composite oxide or the metal composite hydroxide is not oxidized nor reduced (oxides→oxides, hydroxides→hydroxide), conditions under which the metal composite hydroxide is oxidized (hydroxide→oxide), and conditions under which the metal composite oxide is reduced (oxides→hydroxide). For providing conditions which do not cause oxidation nor reduction, it is possible to use an inert gas such as nitrogen or a noble gas (e.g., helium and argon). For providing conditions which oxidize the metal composite hydroxide, the drying may be carried out in an atmosphere of oxygen or air. Further, for providing conditions which reduce the metal composite oxide, a reducing agent such as hydrazine or sodium sulfite may be used in an inert gas atmosphere. As the lithium salt, any of lithium carbonate, lithium nitrate, lithium acetate, lithium hydroxide, lithium hydroxide hydrate and lithium oxide may be used individually or in the form of a mixture of two or more of these lithium salts.

After drying the metal composite oxide or the metal composite hydroxide, the resulting may be subjected to appropriate classification. The aforementioned lithium salt and the metal composite oxide or the metal composite hydroxide are used in respective amounts determined in view of the composition ratio of the end product. For example, when using a nickel-cobalt-manganese composite hydroxide, the lithium salt and the metal composite hydroxide are used in a ratio corresponding to the composition ratio of $LiNi_xCo_yMn_zO_2$ (wherein, $x+y+z=1$). By calcining a mixture of the nickel-cobalt-manganese composite hydroxide and the lithium salts, a lithium-nickel-cobalt-manganese composite oxide can be obtained. That is, a lithium-containing composite metal oxide can be obtained. The calcination may be carried out in dried air, an oxygen atmosphere, an inert atmosphere or the like depending on the desired composition, and may include a plurality of heating steps if necessary.

The mixing may be carried out in either of a dry mixing manner or a wet mixing manner; however, the dry mixing is preferable for its convenience. Examples of the usable mixers include stirring mixers, V-type mixers. W-type mixers, ribbon mixers, drum mixers and ball mills. The conditions for mixing are preferably set such that the aggregated particles are not broken.

The temperature for calcination of the aforementioned metal composite oxide or metal composite hydroxide and lithium compounds such as lithium hydroxide or lithium carbonate is not particularly limited, but is preferably 650° C. to 850° C., and more preferably 700° C. to 850° C. When the calcination temperature is below 650° C., it is likely to cause a drawback that an energy density (discharge capacity) and a high rate discharge performance decrease. This may be attributable to a structural factor disturbing the movement of Li, which is inherently caused by the calcination at a temperature in such a temperature region.

On the other hand, a calcination temperature exceeding 850° C. is likely to cause problems related to production process such as difficulty in obtaining a lithium-containing composite metal oxide having a desired composition due to volatilization of Li and a problem of deterioration of the battery performance due to increased density of the particles. This is due to the fact that, at a temperature above 850° C., a primary particle growth rate increases and a crystal particle of the lithium-containing composite metal oxide becomes too large. In addition, another cause of the problem is considered to reside in that the quantity of Li loss locally increases to cause the structural instability. Furthermore, as the temperature becomes higher, an elemental substitution between sites occupied by a Li element and sites occupied by transition metal elements occurs to an extremely high extent, and the discharge capacity decreases due to inhibition of Li conduction path. With the calcination temperature being in a range of 700° C. to 850° C., a battery having a particularly high energy density (discharge capacity) and an improved charge/discharge cycle performance can be manufactured. The calcination time is preferably 3 hours to 20 hours. The calcination time exceeding 20 hours tends to result in substantially lower battery performance due to volatilization of Li. The calcination time less than 3 hours tends to result in a poor crystal growth and an inferior battery performance. It is also effective to perform a pre-calcination in advance of the aforementioned calcination. Such a precalcining is preferably performed at a temperature in the range of 300° C. provided that the temperature is lower than the temperature for the subsequent calcination, and for a time period of 1 to 10 hours.

[Method for Producing Positive Electrode Active Material for Lithium Secondary Battery]

Using the lithium-containing composite metal oxide, the positive electrode active material for a lithium secondary battery can be produced as follows. For example, a coating material and the lithium-containing composite metal oxide are mixed together, optionally followed by heat treatment, to thereby form a coating layer on the surface of the secondary particles of the lithium-containing composite metal oxide, thus obtaining the positive electrode active material for a lithium secondary battery.

As the coating material, any of oxides, hydroxides, carbonates, nitrates, sulfates, halides, oxalates and alkoxides can be used, among which oxides are preferable.

For more efficiently coating the surface of the lithium-containing composite metal oxide with the coating material, the coating material is preferably in the form of particles finer than the secondary particles of the lithium-containing composite metal oxide. Specifically, the average secondary particle diameter of the coating material is preferably 1 μm or less, and more preferably 0.1 μm or less.

The mixing of the coating material and the lithium-containing composite metal oxide may be carried out in the same manner as in the mixing for preparation of the lithium-containing composite metal oxide. As a specific mixing method, it is preferable to employ a mixing method using a powder mixer having a stirring blade accommodated therein, and a mixing method using a mixing apparatus which is not provided with a mixture media such as balls and which does not cause a strong pulverization. Further, by retaining the obtained mixture in an atmosphere containing water, a coating layer can be firmly adhered to the surface of the lithium-containing composite metal oxide.

With respect to the optional heat treatment to be carried out after mixing the coating material and the lithium-containing composite metal oxide, appropriate conditions therefor (temperature, retention time) may vary depending on the type of the coating material. The temperature for the heat treatment is preferably set within the range of 300 to 850° C. and not higher than the calcination temperature in the production of the lithium-containing composite metal oxide. For example, the temperature for the heat treatment is preferably a temperature which is 0 to 550° C. lower than the aforementioned calcination temperature, and more preferably a temperature which is 50 to 400° C. lower than the calcination temperature. If the temperature for the heat treatment is higher than the calcination temperature in the production of the lithium-containing composite metal oxide, the coating material forms a solid solution with the lithium-containing composite metal oxide, which may hinder the formation of the coating layer. The retention time for the heat treatment is preferably set to be shorter than the retention time for the calcination. For example, the retention time for the heat treatment is preferably 0.5 to 10 hours, more preferably 1 to 8 hours shorter than the retention time for the calcination. As the atmosphere for the heat treatment, the same atmosphere as mentioned above for the calcination can be employed.

Alternatively, the positive electrode active material for a lithium secondary battery can be produced by forming a coating layer on the surface of the lithium-containing composite metal oxide by means of sputtering, CVD, vapor deposition, or the like.

Further, the positive electrode active material for a lithium secondary battery may also be obtained by calcining a mixture of the aforementioned lithium-containing composite metal oxide, lithium salt and coating material.

The resulting lithium-containing composite metal oxide having the coating layer formed thereon is appropriately disintegrated and classified, thereby obtaining the positive electrode active material for a lithium secondary battery.

[Lithium Secondary Battery]

Next, a positive electrode for a lithium secondary battery using the aforementioned lithium-containing composite metal oxide as a positive electrode active material, and a lithium secondary battery including the positive electrode will be described while explaining the constitution of the lithium secondary battery.

An example of the lithium secondary battery of the present embodiment includes a positive electrode, a negative electrode, a separator sandwiched between the positive electrode and the negative electrode, and an electrolytic solution disposed between the positive electrode and the negative electrode.

Figure 1B:
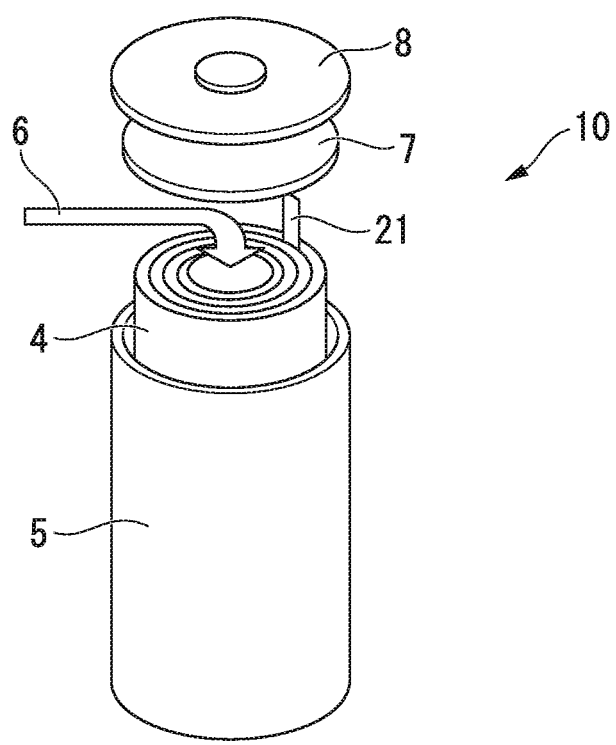
FIG. 1B is a schematic view showing one example of the lithium secondary battery.

Each of FIG. 1A and FIG. 1B is a schematic view illustrating an example of the lithium secondary battery of the present embodiment. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound to obtain an electrode group 4.

Next, as illustrated in FIG. 1B, the electrode group 4 and an insulator (not shown) are put in a battery can 5, then, the bottom of the can is sealed, an electrolytic solution 6 is impregnated into the electrode group 4, and an electrolyte is disposed between the positive electrode 2 and the negative electrode 3. Furthermore, the top section of the battery can 5 is sealed using a top insulator 7 and a sealing body 8, whereby the lithium secondary battery 10 can be obtained.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape, etc.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinafter, the respective components will be described.
(Positive Electrode)

The positive electrode for a lithium secondary battery of the present embodiment can be manufactured by, first, preparing a positive electrode mixture including the aforementioned positive electrode active material for a lithium secondary battery, a conductive material and a binder, and causing the positive electrode mixture supported on a positive electrode current collector.
(Conductive Material)

As the conductive material included in the positive electrode active material for a lithium secondary battery of the present embodiment, a carbonaceous material can be used. Examples of the carbonaceous material include carbon black (such as acetylene black) and a fibrous carbonaceous material. Since carbon black is a microparticle and has a large surface area, the addition of only a small amount of the carbon black to the positive electrode mixture increases the conductivity within the positive electrode for a lithium secondary battery, and improves the charge and discharge efficiency and the output performance as well; however, too large an amount of carbon black deteriorates the binding strength of the binder exerted not only between the positive electrode mixture and the positive electrode current collector but also within the positive electrode mixture, resulting in an adverse factor that increases an internal resistance.

The amount of the conductive material in the positive electrode mixture is preferably from 5 parts by mass to 20 parts by mass, relative to 100 parts by mass of the positive electrode active material for a lithium secondary battery. This amount may be decreased when using a fibrous carbonaceous material such as a graphitized carbon fiber or a carbon nanotube as the conductive material.
(Binder)

As the binder included in the positive electrode active material for a lithium secondary battery of the present embodiment, a thermoplastic resin can be used. Examples of the thermoplastic resin include fluororesins such as polyvinylidene fluoride (hereinafter, in some cases, referred to as PVdF), polytetrafluoroethylene (hereinafter, in some cases, referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in a mixture thereof. When a fluororesin and a polyolefin resin are used as the binder, it is possible to obtain a positive electrode mixture capable of strong adhesive force relative to the positive electrode current collector as well as strong biding force within the positive electrode mixture in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mixture.
(Positive Electrode Current Collector)

As the positive electrode current collector included in the positive electrode active material for a lithium secondary battery of the present embodiment, it is possible to use a strip-shaped member composed of a metal material such as Al, Ni, or stainless steel as a component material. It is especially preferred to use a current collector which is made of Al and is shaped into a thin film because of its low cost.

Examples of the method for causing the positive electrode mixture to be supported on the positive electrode current collector include a method in which the positive electrode mixture is press-formed on the positive electrode current collector. Alternatively, the positive electrode mixture may be caused to be supported on the positive electrode current collector by a method including producing a paste from the positive electrode mixture using an organic solvent, applying the obtained paste of the positive electrode mixture to at least one surface of the positive electrode current collector, drying the paste, and press-bonding the resultant to the current collector.

Examples of the organic solvent that can be used for producing the paste from the positive electrode mixture include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mixture to the positive electrode current collector include a slit die coating method, a screen coating method, a curtain coating method, a knife coating method, a gravure coating method, and an electrostatic spray method.

The positive electrode for a lithium secondary battery can be produced by the method as described above.
(Negative Electrode)

The negative electrode included in the lithium secondary battery of the present embodiment is not particularly limited as long as it is capable of doping and de-doping lithium ions at a potential lower than that in the positive electrode, and examples thereof include an electrode comprising a negative electrode current collector having supported thereon a negative electrode mixture including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than that of the positive electrode active material for a lithium secondary battery.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and SiO; oxides of titanium represented by the formula: $TiO_x$ (wherein x is an positive integer) such as $TiO_2$ and TiO; oxides of vanadium represented by the formula: $VO_x$ (wherein x is an positive integer) such as $V_2O_5$ and $VO_2$; oxides of iron represented by the formula: $FeO_x$ (wherein x is an positive integer) such as $Fe_3O_4$, $Fe_2O_3$ and FeO; oxides of tin represented by the formula: $SnO_x$ (wherein x is an positive integer) such as $SnO_2$ and SnO; oxides of tungsten represented by the formula: WO, (wherein x is an positive integer) such as $WO_3$ and $WO_2$; and metal composite oxides containing lithium and titanium or vanadium such as $Li_4Ti_5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and TiS; sulfides of vanadium represented by the formula: $VS_x$ (wherein x is an positive integer) such as $V_3S_4$, $VS_2$ and VS; sulfides of iron represented by the formula: $FeS_x$ (wherein x is an positive integer) such as $Fe_3S_4$, $FeS_2$ and FeS; sulfides of molybdenum represented by the formula: $MoS_x$ (wherein x is an positive integer) such as $Mo_2S_3$ and $MoS_2$; sulfides of tin represented by the formula: $SnS_x$ (wherein x is an positive integer) such as $SnS_2$ and SnS; sulfides of tungsten represented by the formula: $WS_x$ (wherein x is an positive integer) such as $WS_2$; sulfides of antimony represented by the formula: $SbS_x$ (wherein x is an positive integer) such as $Sb_2S_3$; and sulfides of selenium represented by the formula: $SeS_x$ (wherein x is an positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and 0<x<3).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode materials, carbonaceous materials composed mainly of graphite such as natural graphite or artificial graphite are preferably used for the following reasons: the potential of the negative electrode hardly changes during charging from a uncharged state to a fully charged state (the potential flatness is favorable), the average discharge potential is lower, the capacity maintenance rate after repeated charge/discharge cycles is higher (the cycle characteristics are favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mixture may include a binder as necessary. As the binder, a thermoplastic resin can be used, and examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mixture to be supported on the above-described negative electrode current collector include, as in the case of the positive electrode, a press forming method, and a method in which a paste of the negative electrode mixture obtained by using a solvent etc., is applied to and dried on the negative electrode current collector, and the resulting is press bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials as mentioned above, or may be formed by laminating these materials.

Examples of the separator include separators described in Japanese Unexamined Patent Application Publication No. 2000-30686 and Japanese Unexamined Patent Application Publication No. Hei10-324758. In order to increase the volumetric energy density of the battery and to decrease the internal resistance, the thickness of the separator is preferred to be as small as possible, as long as a sufficient mechanical strength can be secured. The thickness is preferably about 5 to 200 μm, more preferably about 5 to 40 μm.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(S_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein FSI means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1,3-dioxolane-2-one, and 1,2-di(methoxycarbonyloxy)ethane; an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and γ-butyrolactone; a nitrile such as acetonitrile and butyronitrile; an amide such as N,N-dimethyl formamide and N,N-dimethylacetoamide; a carbamate such as 3-methyl-2-oxazolidone; a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after discharging at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including ether having a fluorine substituent such as pentafluoropropylene methyl ether or 2,2,3,3-tetrafluoropropyl difluoromethyl ether and dimethyl carbonate is more preferable since a high capacity maintenance ratio is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as $Li_2S-SiS_2$, $Li_2S-GeS_2$, $Li_2S-P_2S_5$, $Li_2S-B_2S_3$, $Li_2S-SiS_2-Li_3PO_4$, $Li_2S-SiS_2-Li_2SO_4$, and $Li_2S-GeS_2-P_2S_5$. In some cases, the use of such a solid electrolyte may further improve the thermal stability of the lithium secondary battery.

In the lithium secondary battery of the present embodiment, the solid electrolyte, when used, serves as a separator. In such a case, the separator may be omitted.

The positive electrode active material for a lithium secondary battery having features as described above uses the lithium-containing composite metal oxide having a coating layer formed thereon, whereby a lithium secondary battery using the positive electrode active material is capable of higher power output at high current rate than the conventional lithium secondary batteries.

The positive electrode for a lithium secondary battery having features as described above has the positive electrode active material of the present embodiment using the aforementioned lithium-containing composite metal oxide, whereby a lithium secondary battery using the positive electrode is capable of higher power output at high current rate than the conventional lithium secondary batteries.

Further, the lithium secondary battery having features as described above has the aforementioned positive electrode, and hence is capable of higher power output at high current rate than the conventional lithium secondary batteries.

EXAMPLES

Hereinbelow, the present invention will be described in more detail with reference to the Examples.

In the present Examples, evaluations of the produced positive electrode active material for a lithium secondary battery, positive electrode for a lithium secondary battery and lithium secondary battery were implemented as follows.

(1) Evaluation of Positive Electrode Active Material for Lithium Secondary Battery 1. Crystal Structure Analysis The crystal structure analysis was carried out using an X-ray diffractometer (X'Pert PRO, manufactured by PANalytical). A sample powder was charged onto a specifically designed substrate, and the measurement was carried out using a Cu-Kα radiation source with a diffraction angle in the range of 2θ=10° to 90°, thereby obtaining a powder X-ray diffraction pattern. From the X-ray powder diffraction pattern, the intensity of the peak corresponding to the (003) diffraction peak and the intensity of the peak corresponding to the (104) diffraction peak were determined using a comprehensive X-ray powder diffraction pattern analysis software JADES, and the peak intensity ratio was calculated.

$2θ=18.7±1°$ (003) diffraction peak:

$2θ=44.6±1°$ (104) diffraction peak:

2. Composition Analysis

The composition analysis was carried out using an inductively coupled plasma emission spectrometer (SPS3000, manufactured by SH Nano Technology Inc.) after the sample powder was dissolved in hydrochloric acid.

3. Measurement of Average Primary Particle Diameter

First, the sample powder was placed on a conductive sheet attached onto a sample stage, and SEM observation was carried out by radiating an electron beam with an accelerated voltage of 20 kV using a JSM-5510 manufactured by JEOL Ltd. 50 primary particles were arbitrarily selected in an image (SEM photograph) obtained from the SEM observation, parallel lines were drawn from a certain direction so as to sandwich the projection image of each primary particle, and the distance between the parallel lines was measured as the particle diameter of the primary particle. The arithmetic average value of the obtained particle diameters is the average primary particle diameter.

4. Measurement of Average Secondary Particle Diameter 0.1 g of a sample powder was added to 50 ml of 0.2 wt % aqueous solution of sodium hexametaphosphate, thereby obtaining a dispersion with the powder dispersed therein. The obtained dispersion was subjected to a particle size distribution measurement using a laser scattering particle size distribution measuring apparatus (Mastersizer 2000, manufactured by Malvern Instruments Ltd.), whereby the volume-based particle size distribution was measured. From the obtained cumulative particle size distribution curve, the particle diameter ($D_{50}$) at a 50%/o cumulation measured from the smallest particle side is determined as the average secondary particle diameter. Similarly, the particle diameter ($D_{10}$) at a 10% cumulation measured from the smallest particle side is determined as the 10/o cumulative diameter, and the particle diameter ($D_{90}$) at a 90% cumulation measured from the smallest particle side is determined as the 90% cumulative diameter.

5. Measurement of Bet Specific Surface Area

The BET specific surface area was measured using a FLOWSORB 112300 manufactured by Micromeritics Instrument Corporation after 1 g of the sample powder was dried at 150° C. in a nitrogen atmosphere for 15 minutes.

6. Measurement of Bulk Density

The tamped density and untamped density were measured in accordance with the method prescribed in JIS R 1628-1997.

7. Analysis of Coating Layer

The secondary particles of the positive electrode active material for a lithium secondary battery was sliced by FIB, and was subjected to elemental mapping and elemental line analysis of the cross-section of the secondary particles using a STEM-EDX apparatus. The presence or absence of the coating layer was confirmed based on whether or not element $M^2$ is biasedly distributed on the surface of the secondary particles.

10 g of the powder of the positive electrode active material for a lithium secondary battery was added into a mixed solution of 1 L of 30% hydrochloric acid and 3 ml of 30% hydrogen peroxide solution, followed by stirring for 2 hr at 25° C. to dissolve the powder. The resulting residue was filtered, washed with water and dried. The thus obtained powder was used for the aforementioned "1. Crystal Structure Analysis" and "2. Composition Analysis".

(2) Production of Positive Electrode for Lithium Secondary Battery

A positive electrode active material obtained by a production method described below, a conductive material (acetylene black), and a binder (PVdF) were mixed and kneaded so as to obtain a composition of the positive electrode active material, the conductive material, and the binder at a mass ratio of 92:5:3, thereby preparing a paste-form positive electrode mixture. During the preparation of the positive electrode mixture, N-methyl-2-pyrrolidone was used as an organic solvent.

The obtained positive electrode mixture was applied to a 40 µm-thick Al foil which served as a current collector, and was dried in a vacuum at 150° C. for eight hours, thereby obtaining a positive electrode for a lithium secondary battery. The electrode area of the positive electrode for a lithium secondary battery was set to 1.65 cm2.

(3) Production of Lithium Secondary Battery (Coin-Type Battery)

The following operations were carried out in an argon atmosphere within a glove box.

The positive electrode produced in the "(2) Production of Positive Electrode for Lithium Secondary Battery" was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 µm)) was placed on the positive electrode. 300 µl of an electrolytic solution was injected thereinto. The electrolytic solution used was prepared by dissolving 1 mol/l of $LiPF_6$ in a liquid mixture of ethylene carbonate (hereinafter, sometimes also referred to as "EC"), dimethyl carbonate (hereinafter, sometimes also referred to as "DMC"), and ethyl methyl carbonate (hereinafter, sometimes also referred to as "EMC") at a volume ratio of 30:35:35. The electrolytic solution is hereinafter sometimes also referred to as "$LiPF_6$EC+DMC+EMC".

Next, metal lithium used as a negative electrode was placed on the laminate film separator, was covered with a top lid through a gasket, and was swaged using a swage, thereby producing a lithium secondary battery (coin-type battery R2032, hereinafter, in some cases, referred to as "coin-type battery").

(4) Charge and Discharge Test

A discharge rate test was carried out under conditions described below using the coin-type battery produced in the "(3) Production of Lithium Secondary Battery (Coin-type Battery)". The discharge capacity maintenance ratio at 3CA in the discharge rate test was determined as follows.

<Discharge Rate Test>

Test temperature: 25° C.

Constant current/constant voltage charging: maximum charge voltage of 4.3 V, charge time of 8 hours, and charge current of 0.2 CA.

Constant Current Discharging: minimum discharge voltage of 3.0 V.

Based on the discharge capacity in a constant current discharge at 0.2 CA and the discharge capacity in a discharge at 3CA, the discharge capacity retention at 3CA was determined by the following formula. The higher the discharge capacity retention at 3CA means higher output.

<Discharge Capacity Retention at 3CA>

Discharge capacity retention (%) at 3CA=Discharge capacity at 3CA/Discharge capacity at 0.2CA× 100

Example 1

1. Production of Positive Electrode Active Material C1

Into a reaction vessel equipped with a stirrer and an overflow pipe was charged water, followed by addition of an aqueous sodium hydroxide solution.

An aqueous nickel sulfate solution and an aqueous cobalt sulfate solution were mixed together such that the atomic ratio of nickel atoms to cobalt atoms became 0.92:0.08, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.4, thereby obtaining nickel-cobalt composite hydroxide particles. The resulting particles were washed with water after filtration, and dried at 100° C., to thereby obtain a metal complex compound A1 in the form of dry powder. The BET specific surface area of the obtained metal complex compound A1 was 9.2 $m^2$/g. The results of the composition analysis thereof revealed that the molar ratio of Ni:Co was 0.92:0.08.

A lithium hydroxide powder and the metal complex compound A1 were weighed into a mortar such that Li/(Ni+Co)=1.03, followed by dry mixing in the mortar. The resulting was calcined in oxygen atmosphere at 750° C. for 10 hours, thereby obtaining a lithium-containing composite metal oxide B1.

The results of the composition analysis of the lithium-containing composite metal oxide B1 revealed that the molar ratio of Li:Ni:Co was 1.03:0.92:0.08.

The lithium-containing composite metal oxide B1 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni and Co in the lithium-containing composite metal oxide B1, which means that the ratio of the atomic ratio of Al to the sum of the atomic ratios of Ni and Co is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C1.

2. Evaluation of Positive Electrode Active Material for Lithium Secondary Battery As a result of the powder X-ray diffraction (XRD) analysis of the obtained positive electrode active material C1, it was found that the crystal structure of the positive electrode active material C1 belonged to a space group of R-3m, and the intensity ratio of the (003) peak to the (104) peak in an XRD pattern was 1.7.

The primary particle diameter and the secondary particle diameter of the positive electrode active material C1 were respectively 0.5 μm and 11 μm.

The BET specific surface area of the positive electrode active material C1 was 0.5 m$^2$/g.

The tamped density of the positive electrode active material C1 was 2.5 g/cm$^3$, the untamped density of the positive electrode active material C1 was 1.6 g/cm$^3$, and the value obtained by dividing the tamped density by the untamped density was 1.6.

The cross-sectional STEM-EDX analysis of particles of the positive electrode active material C1 revealed that the particles had a coating layer, and the composition analysis and the crystal structure analysis of a residual powder obtained by dissolving a powder of the positive electrode active material C1 in hydrochloric acid revealed that the positive electrode active material C1 was α-LiAlO$_2$.

The value of $D_{90}/D_{10}$ obtained from the particle size distribution measurement values of the positive electrode active material C1 was 2.1.

3. Discharge Rate Test of Lithium Secondary Battery

A coin-type battery was produced using the positive electrode active material C1, and a discharge rate test was carried out. As a result, the discharge capacity retention at 3CA was 76%.

Example 2

1. Production of Positive Electrode Active Material C2

Into a reaction vessel equipped with a stirrer and an overflow pipe was charged water, followed by addition of an aqueous sodium hydroxide solution.

An aqueous nickel sulfate solution, an aqueous cobalt sulfate solution and an aqueous magnesium sulfate solution were mixed together such that the atomic ratio between nickel atoms, cobalt atoms and magnesium atoms became 0.90:0.08:0.02, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.3, thereby obtaining nickel-cobalt-magnesium composite hydroxide particles. The resulting particles were washed with water after filtration, and dried at 100° C., to thereby obtain a metal complex compound A2 in the form of dry powder. The BET specific surface area of the obtained metal complex compound A2 was 9.9 m$^2$/g.

The results of the composition analysis thereof revealed that the molar ratio of Ni:Co:Mg was 0.90:0.08:0.02.

A lithium hydroxide powder and the metal complex compound A2 were weighed into a mortar such that Li/(Ni+Co+Mg)=1.03, followed by dry mixing in the mortar. The resulting was calcined in oxygen atmosphere at 750° C. for 10 hours, thereby obtaining a lithium-containing composite metal oxide B2.

The results of the composition analysis of the lithium-containing composite metal oxide B2 revealed that the molar ratio of Li:Ni:Co:Mg was 1.03:0.90:0.08:0.02.

The lithium-containing composite metal oxide B2 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni, Co and Mg in the lithium-containing composite metal oxide B2, which means that the ratio of the atomic ratio of Al to the sum of the atomic ratios of Ni, Co and Mg is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C2.

2. Evaluation of Positive Electrode Active Material for Lithium Secondary Battery As a result of the powder X-ray diffraction (XRD) analysis of the obtained positive electrode active material C2, it was found that the crystal structure of the positive electrode active material C2 belonged to a space group of R-3m, and the intensity ratio of the (003) peak to the (104) peak in an XRD pattern was 1.6.

The primary particle diameter and the secondary particle diameter of the positive electrode active material C2 were respectively 0.5 μm and 12 μm.

The BET specific surface area of the positive electrode active material C2 was 0.5 m$^2$/g.

The tamped density of the positive electrode active material C2 was 2.3 g/cm$^3$, the untamped density of the positive electrode active material C2 was 1.8 g/cm$^3$, and the value obtained by dividing the tamped density by the untamped density was 1.3.

The cross-sectional STEM-EDX analysis of particles of the positive electrode active material C2 revealed that the particles had a coating layer, and the ICP composition analysis and the powder X-ray diffraction pattern of a residual powder obtained by dissolving a powder of the positive electrode active material C2 in hydrochloric acid revealed that the positive electrode active material C2 was α-LiAlO$_2$.

The value of $D_{90}/D_{10}$ obtained from the particle size distribution measurement values of the positive electrode active material C2 was 2.7.

3. Discharge Rate Test of Lithium Secondary Battery

A coin-type battery was produced using the positive electrode active material C2, and a discharge rate test was carried out. As a result, the discharge capacity retention at 3CA was 82%.

Example 3

1. Production of Positive Electrode Active Material C3

Into a reaction vessel equipped with a stirrer and an overflow pipe was charged water, followed by addition of an aqueous sodium hydroxide solution.

An aqueous nickel sulfate solution, an aqueous cobalt sulfate solution and an aqueous manganese sulfate solution were mixed together such that the atomic ratio between nickel atoms, cobalt atoms and manganese atoms became 0.90:0.08:0.02, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.1, thereby obtaining nickel-cobalt-manganese composite hydroxide particles. The resulting particles were washed with water after filtration, and dried at 100° C., to thereby obtain a metal complex compound A3 in the form of dry powder. The BET specific surface area of the obtained metal complex compound A3 was 10.6 m$^2$/g. The results of the composition analysis thereof revealed that the molar ratio of Ni:Co:Mn was 0.90:0.08:0.02.

A lithium hydroxide powder and the metal complex compound A3 were weighed into a mortar such that Li/(Ni+Co+Mn)=1.03, followed by dry mixing in the mortar. The resulting was calcined in oxygen atmosphere at 750° C. for 10 hours, thereby obtaining a lithium-containing composite metal oxide B3. The results of the composition analysis of the lithium-containing composite metal oxide B3 revealed that the molar ratio of Li:Ni:Co:Mn was 1.03:0.90:0.08:0.02.

The lithium-containing composite metal oxide B3 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni, Co and Mn in the lithium-containing composite metal oxide B3, which means that the ratio of the atomic ratio of Al to the sum of the atomic ratios of Ni, Co and Mn is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C3.

2. Evaluation of Positive Electrode Active Material for Lithium Secondary Battery As a result of the powder X-ray diffraction (XRD) analysis of the obtained positive electrode active material C3, it was found that the crystal structure of the positive electrode active material C3 belonged to a space group of R-3m, and the intensity ratio of the (003) peak to the (104) peak in an XRD pattern was 1.9.

The primary particle diameter and the secondary particle diameter of the positive electrode active material C3 were respectively 0.4 µm and 10 µm.

The BET specific surface area of the positive electrode active material C3 was 0.3 m$^2$/g.

The tamped density of the positive electrode active material C3 was 2.4 g/cm$^3$, the untamped density of the positive electrode active material C3 was 1.6 g/cm$^3$, and the value obtained by dividing the tamped density by the untamped density was 1.5.

The cross-sectional STEM-EDX analysis of particles of the positive electrode active material C3 revealed that the particles had a coating layer, and the ICP composition analysis and the powder X-ray diffraction pattern of a residual powder obtained by dissolving a powder of the positive electrode active material C3 in hydrochloric acid revealed that the positive electrode active material C3 was α-LiAlO$_2$.

The value of $D_{90}/D_{10}$ obtained from the particle size distribution measurement values of the positive electrode active material C3 was 1.9.

3. Discharge Rate Test of Lithium Secondary Battery

A coin-type battery was produced using the positive electrode active material C3, and a discharge rate test was carried out. As a result, the discharge capacity retention at 3CA was 76%.

Example 4

1. Production of Positive Electrode Active Material C4

Into a reaction vessel equipped with a stirrer and an overflow pipe was charged water, followed by addition of an aqueous sodium hydroxide solution.

An aqueous nickel sulfate solution, an aqueous cobalt sulfate solution and an aqueous aluminum sulfate solution were mixed together such that the atomic ratio between nickel atoms, cobalt atoms and aluminum atoms became 0.90:0.08:0.02, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.2, thereby obtaining nickel-cobalt-aluminum composite hydroxide particles. The resulting particles were washed with water after filtration, and dried at 100° C., to thereby obtain a metal complex compound A4 in the form of dry powder. The BET specific surface area of the obtained metal complex compound A4 was 10.3 m²/g. The results of the composition analysis thereof revealed that the molar ratio of Ni:Co:Al was 0.90:0.08: 0.02.

A lithium hydroxide powder and the metal complex compound A4 were weighed into a mortar such that Li/(Ni+Co+Al)=1.03, followed by dry mixing in the mortar. The resulting was calcined in oxygen atmosphere at 750° C. for 10 hours, thereby obtaining a lithium-containing composite metal oxide B4.

The results of the composition analysis of the lithium-containing composite metal oxide 14 revealed that the molar ratio of Li:Ni:Co:Al was 1.03:0.90:0.08:0.02.

The lithium-containing composite metal oxide 14 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni, Co and Al in the lithium-containing composite metal oxide B4, which means that the ratio of the atomic ratio of Al derived from aluminum oxide to the sum of the atomic ratios of Ni, Co and Al derived from B4 is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C4.

2. Evaluation of Positive Electrode Active Material for Lithium Secondary Battery As a result of the powder X-ray diffraction (XRD) analysis of the obtained positive electrode active material C4, it was found that the crystal structure of the positive electrode active material C4 belonged to a space group of R-3m, and the intensity ratio of the (003) peak to the (104) peak in an XRD pattern was 1.8.

The primary particle diameter and the secondary particle diameter of the positive electrode active material C4 were respectively 0.5 μm and 13 μm.

The BET specific surface area of the positive electrode active material C4 was 0.6 m²/g.

The tamped density of the positive electrode active material C4 was 2.4 g/cm³, the untamped density of the positive electrode active material C4 was 1.7 g/cm³, and the value obtained by dividing the tamped density by the untamped density was 1.4.

The cross-sectional STEM-EDX analysis of particles of the positive electrode active material C4 revealed that the particles had a coating layer, and the ICP composition analysis and the powder X-ray diffraction pattern of a residual powder obtained by dissolving a powder of the positive electrode active material C4 in hydrochloric acid revealed that the positive electrode active material C4 was α-LiAlO₂.

The value of $D_{90}/D_{10}$ obtained from the particle size distribution measurement values of the positive electrode active material C4 was 2.8.

3. Discharge Rate Test of Lithium Secondary Battery

A coin-type battery was produced using the positive electrode active material C4, and a discharge rate test was carried out. As a result, the discharge capacity retention at 3CA was 78%.

Example 5

1. Production of Positive Electrode Active Material C5

Into a reaction vessel equipped with a stirrer and an overflow pipe was charged water, followed by addition of an aqueous sodium hydroxide solution.

An aqueous nickel sulfate solution, an aqueous cobalt sulfate solution and an aqueous zinc sulfate solution were mixed together such that the atomic ratio between nickel atoms, cobalt atoms and zinc atoms became 0.90:0.08:0.02, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 11.1, thereby obtaining nickel-cobalt-zinc composite hydroxide particles. The resulting particles were washed with water after filtration, and dried at 100° C., to thereby obtain a metal complex compound A5 in the form of dry powder. The BET specific surface area of the obtained metal complex compound A5 was 10.3 m²/g. The results of the composition analysis thereof revealed that the molar ratio of Ni:Co:Zn was 0.90:0.08:0.02.

A lithium hydroxide powder and the metal complex compound A5 were weighed into a mortar such that Li/(Ni+Co+Zn)=1.03, followed by dry mixing in the mortar. The resulting was calcined in oxygen atmosphere at 750° C. for 10 hours, thereby obtaining a lithium-containing composite metal oxide B5.

The results of the composition analysis of the lithium-containing composite metal oxide B5 revealed that the molar ratio of Li:Ni:Co:Zn was 1.03:0.90:0.08:0.02.

The lithium-containing composite metal oxide B5 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni, Co and Zn in the lithium-containing composite metal oxide B5, which means that the ratio of the atomic ratio of Al to the sum of the atomic ratios of Ni, Co and Zn is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C5.

2. Evaluation of Positive Electrode Active Material for Lithium Secondary Battery As a result of the powder X-ray diffraction (XRD) analysis of the obtained positive electrode active material C5, it was found that the crystal structure of the positive electrode active material C5 belonged to a space group of R-3m, and the intensity ratio of the (003) peak to the (104) peak in an XRD pattern was 1.7.

The primary particle diameter and the secondary particle diameter of the positive electrode active material C5 were respectively 0.5 μm and 11 μm.

The BET specific surface area of the positive electrode active material C5 was 0.5 m$^2$/g.

The tamped density of the positive electrode active material $C_5$ was 2.2 g/cm$^3$, the untamped density of the positive electrode active material C5 was 1.8 g/cm$^3$, and the value obtained by dividing the tamped density by the untamped density was 1.2.

The cross-sectional STEM-EDX analysis of particles of the positive electrode active material C5 revealed that the particles had a coating layer, and the ICP composition analysis and the powder X-ray diffraction pattern of a residual powder obtained by dissolving a powder of the positive electrode active material C5 in hydrochloric acid revealed that the positive electrode active material C5 was α-LiAlO$_2$.

The value of $D_{90}/D_{10}$ obtained from the particle size distribution measurement values of the positive electrode active material C5 was 2.0.

3. Discharge Rate Test of Lithium Secondary Battery

A coin-type battery was produced using the positive electrode active material C5, and a discharge rate test was carried out. As a result, the discharge capacity retention at 3CA was 74%.

Example 6

1. Production of Positive Electrode Active Material C6

A lithium hydroxide powder, the metal complex compound A1 and tin oxide were weighed into a mortar such that Li/(Ni+Co+Sn)=1.03, followed by dry mixing in the mortar. The resulting was calcined in oxygen atmosphere at 750° C. for 10 hours, thereby obtaining a lithium-containing composite metal oxide B6.

The results of the composition analysis of the lithium-containing composite metal oxide B6 revealed that the molar ratio of Li:Ni:Co:Sn was 1.03:0.90:0.08:0.02.

The lithium-containing composite metal oxide B6 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni, Co and Sn in the lithium-containing composite metal oxide B6, which means that the ratio of the atomic ratio of Al to the sum of the atomic ratios of Ni, Co and Sn is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C6.

2. Evaluation of Positive Electrode Active Material for Lithium Secondary Battery As a result of the powder X-ray diffraction (XRD) analysis of the obtained positive electrode active material C6, it was found that the crystal structure of the positive electrode active material C6 belonged to a space group of R-3m, and the intensity ratio of the (003) peak to the (104) peak in an XRD pattern was 1.7.

The primary particle diameter and the secondary particle diameter of the positive electrode active material C6 were respectively 0.6 μm and 10 μm.

The BET specific surface area of the positive electrode active material C6 was 0.5 m$^2$/g.

The tamped density of the positive electrode active material C6 was 2.0 g/cm$^3$, the untamped density of the positive electrode active material C6 was 1.7 g/cm$^3$, and the value obtained by dividing the tamped density by the untamped density was 1.2.

The cross-sectional STEM-EDX analysis of particles of the positive electrode active material C6 revealed that the particles had a coating layer, and the ICP composition analysis and the powder X-ray diffraction pattern of a residual powder obtained by dissolving a powder of the positive electrode active material C6 in hydrochloric acid revealed that the positive electrode active material C6 was α-LiAlO$_2$.

The value of $D_{90}/D_{10}$ obtained from the particle size distribution measurement values of the positive electrode active material C6 was 2.0.

3. Discharge Rate Test of Lithium Secondary Battery

A coin-type battery was produced using the positive electrode active material C6, and a discharge rate test was carried out. As a result, the discharge capacity retention at 3CA was 74%.

Comparative Example 1

1. Production of Positive Electrode Active Material for Lithium Secondary Battery The lithium-containing composite metal oxide B1 was used as a positive electrode active material for a lithium secondary battery.

2. Evaluation of Positive Electrode Active Material for Lithium Secondary Battery As a result of the powder X-ray diffraction (XRD) analysis of the lithium-containing composite metal oxide B1, it was found that the crystal structure of the lithium-containing composite metal oxide B1 belonged to a space group of R-3m, and the intensity ratio of the (003) peak to the (104) peak in an XRD pattern was 1.7.

The primary particle diameter and the secondary particle diameter of the lithium-containing composite metal oxide B1 were respectively 0.5 μm and 11 μm.

The BET specific surface area of the lithium-containing composite metal oxide B1 was 0.4 m$^2$/g.

The tamped density of the lithium-containing composite metal oxide B1 was 2.2 g/cm$^3$, the untamped density of the lithium-containing composite metal oxide B1 was 1.6 g/cm$^3$, and the value obtained by dividing the tamped density by the untamped density was 1.4.

The value of $D_{90}/D_{10}$ obtained from the particle size distribution measurement values of the lithium-containing composite metal oxide B1 was 2.3.

3. Discharge Rate Test of Lithium Secondary Battery

A coin-type battery was produced using the lithium-containing composite metal oxide B1, and a discharge rate test was carried out. As a result, the discharge capacity retention at 3CA was 57%.

Comparative Example 2

1. Production of Positive Electrode Active Material for Lithium Secondary Battery The lithium-containing composite metal oxide B2 was used as a positive electrode active material for a lithium secondary battery.

2. Evaluation of Positive Electrode Active Material for Lithium Secondary Battery As a result of the powder X-ray diffraction (XRD) analysis of the lithium-containing composite metal oxide B2, it was found that the crystal structure of the lithium-containing composite metal oxide B2 belonged to a space group of R-3m, and the intensity ratio of the (003) peak to the (104) peak in an XRD pattern was 1.5.

The primary particle diameter and the secondary particle diameter of the lithium-containing composite metal oxide B2 were respectively 0.5 μm and 12 μm.

The BET specific surface area of the lithium-containing composite metal oxide B2 was 0.4 m$^2$/g.

The tamped density of the lithium-containing composite metal oxide B2 was 2.2 g/cm$^3$, the untamped density of the lithium-containing composite metal oxide B2 was 1.6 g/cm$^3$, and the value obtained by dividing the tamped density by the untamped density was 1.4.

The value of $D_{90}/D_{10}$ obtained from the particle size distribution measurement values of the lithium-containing composite metal oxide B2 was 2.5.

3. Discharge Rate Test of Lithium Secondary Battery

A coin-type battery was produced using the lithium-containing composite metal oxide B2, and a discharge rate test was carried out. As a result, the discharge capacity retention at 3CA was 53%.

Comparative Example 3

1. Production of Positive Electrode Active Material for Lithium Secondary Battery The lithium-containing composite metal oxide B3 was used as a positive electrode active material for a lithium secondary battery.

2. Evaluation of Positive Electrode Active Material for Lithium Secondary Battery As a result of the powder X-ray diffraction (XRD) analysis of the lithium-containing composite metal oxide B3, it was found that the crystal structure of the lithium-containing composite metal oxide B3 belonged to a space group of R-3m, and the intensity ratio of the (003) peak to the (104) peak in an XRD pattern was 1.8.

The primary particle diameter and the secondary particle diameter of the lithium-containing composite metal oxide B3 were respectively 0.4 μm and 10 μm.

The BET specific surface area of the lithium-containing composite metal oxide B3 was 0.3 m$^2$/g.

The tamped density of the lithium-containing composite metal oxide B3 was 2.1 g/cm$^3$, the untamped density of the lithium-containing composite metal oxide B3 was 1.6 g/cm$^3$, and the value obtained by dividing the tamped density by the untamped density was 1.3.

The value of $D_{90}/D_{10}$ obtained from the particle size distribution measurement values of the lithium-containing composite metal oxide B3 was 1.9.

3. Discharge Rate Test of Lithium Secondary Battery

A coin-type battery was produced using the lithium-containing composite metal oxide B3, and a discharge rate test was carried out. As a result, the discharge capacity retention at 3CA was 56%.

Comparative Example 4

1. Production of Positive Electrode Active Material for Lithium Secondary Battery The lithium-containing composite metal oxide B4 was used as a positive electrode active material for a lithium secondary battery.

2. Evaluation of Positive Electrode Active Material for Lithium Secondary Battery As a result of the powder X-ray diffraction (XRD) analysis of the lithium-containing composite metal oxide B4, it was found that the crystal structure of the lithium-containing composite metal oxide B4 belonged to a space group of R-3m, and the intensity ratio of the (003) peak to the (104) peak in an XRD pattern was 1.6.

The primary particle diameter and the secondary particle diameter of the lithium-containing composite metal oxide B4 were respectively 0.5 μm and 14 μm.

The BET specific surface area of the lithium-containing composite metal oxide B4 was 0.4 m$^2$/g.

The tamped density of the lithium-containing composite metal oxide B4 was 2.2 g/cm$^3$, the untamped density of the lithium-containing composite metal oxide B4 was 1.6 g/cm$^3$, and the value obtained by dividing the tamped density by the untamped density was 1.4.

The value of $D_{90}/D_{10}$ obtained from the particle size distribution measurement values of the lithium-containing composite metal oxide B4 was 3.6.

3. Discharge Rate Test of Lithium Secondary Battery

A coin-type battery was produced using the lithium-containing composite metal oxide B4, and a discharge rate test was carried out. As a result, the discharge capacity retention at 3CA was 35%.

Comparative Example 5

1. Production of Positive Electrode Active Material for Lithium Secondary Battery The lithium-containing composite metal oxide B5 was used as a positive electrode active material for a lithium secondary battery.

2. Evaluation of Positive Electrode Active Material for Lithium Secondary Battery As a result of the powder X-ray diffraction (XRD) analysis of the lithium-containing composite metal oxide 5, it was found that the crystal structure of the lithium-containing composite metal oxide B5 belonged to a space group of R-3m, and the intensity ratio of the (003) peak to the (104) peak in an XRD pattern was 1.6.

The primary particle diameter and the secondary particle diameter of the lithium-containing composite metal oxide B5 were respectively 0.5 μm and 12 μm.

The BET specific surface area of the lithium-containing composite metal oxide B5 was 0.5 m$^2$/g.

The tamped density of the lithium-containing composite metal oxide B5 was 2.1 g/cm$^3$, the untamped density of the lithium-containing composite metal oxide B5 was 1.6 g/cm$^3$, and the value obtained by dividing the tamped density by the untamped density was 1.3.

The value of $D_{90}/D_{10}$ obtained from the particle size distribution measurement values of the lithium-containing composite metal oxide B5 was 2.4.

3. Discharge Rate Test of Lithium Secondary Battery

A coin-type battery was produced using the lithium-containing composite metal oxide B5, and a discharge rate test was carried out. As a result, the discharge capacity retention at 3CA was 32%.

Comparative Example 6

1. Production of Positive Electrode Active Material for Lithium Secondary Battery The lithium-containing composite metal oxide B6 was used as a positive electrode active material for a lithium secondary battery.

2. Evaluation of Positive Electrode Active Material for Lithium Secondary Battery As a result of the powder X-ray diffraction (XRD) analysis of the lithium-containing composite metal oxide B6, it was found that the crystal structure of the lithium-containing composite metal oxide B6 belonged to a space group of R-3m, and the intensity ratio of the (003) peak to the (104) peak in an XRD pattern was 1.9.

The primary particle diameter and the secondary particle diameter of the lithium-containing composite metal oxide B6 were respectively 0.6 μm and 10 μm.

The BET specific surface area of the lithium-containing composite metal oxide B6 was 0.4 m$^2$/g.

The tamped density of the lithium-containing composite metal oxide B6 was 2.2 g/cm$^3$, the untamped density of the lithium-containing composite metal oxide B6 was 1.6 g/cm$^3$, and the value obtained by dividing the tamped density by the untamped density was 1.4.

The value of $D_{90}/D_{10}$ obtained from the particle size distribution measurement values of the lithium-containing composite metal oxide B6 was 1.9.

3. Discharge Rate Test of Lithium Secondary Battery

A coin-type battery was produced using the lithium-containing composite metal oxide B6, and a discharge rate test was carried out. As a result, the discharge capacity retention at 3CA was 59%.

Comparative Example 7

1. Production of Positive Electrode Active Material C7

An aqueous potassium hydroxide solution was added to a reaction vessel equipped with a stirrer.

Then, an aqueous nickel sulfate solution was continuously added to the reaction vessel with stirring, and an aqueous potassium hydroxide solution was dropwise added thereto at an appropriate timing such that the pH of the solution in the reaction vessel became 12.9, thereby obtaining nickel hydroxide particles.

The resulting particles were washed with water after filtration, and dried at 100° C., to thereby obtain a metal complex compound A7 in the form of dry powder. The BET specific surface area of the obtained metal complex compound A7 was 60 m$^2$/g.

A lithium hydroxide powder and the metal complex compound A7 were weighed into a mortar such that Li/Ni=1.03, followed by dry mixing in the mortar. The resulting was calcined in ambient atmosphere at 650° C. for 10 hours, thereby obtaining a lithium-containing composite metal oxide B7.

The results of the composition analysis of the lithium-containing composite metal oxide B7 revealed that the molar ratio of Li:Ni was 1.01:1.

The lithium-containing composite metal oxide B7 and an aluminum oxide were added to a mortar, followed by dry mixing in the mortar, thereby obtaining a powder mixture. The aluminum oxide was "'Alumina C'" manufactured by Nippon Aerosil Co., Ltd., which had an average primary particle diameter of 13 nm, and an Al content of 0.02 mol per 1 mol of Ni in the lithium-containing composite metal oxide B7, which means that the ratio of the atomic ratio of Al to the atomic ratio of Ni is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C7.

2. Evaluation of Positive Electrode Active Material for Lithium Secondary Battery As a result of the powder X-ray diffraction (XRD) analysis of the obtained positive electrode active material C7, it was found that the crystal structure of the positive electrode active material C7 belonged to a space group of R-3m, and the intensity ratio of the (003) peak to the (104) peak in an XRD pattern was 1.5.

The primary particle diameter and the secondary particle diameter of the positive electrode active material C7 were respectively 0.4 μm and 18 μm.

The BET specific surface area of the positive electrode active material C7 was 1.6 m²/g.

The tamped density of the positive electrode active material C7 was 1.9 g/cm³, the untamped density of the positive electrode active material C7 was 0.89 g/cm³, and the value obtained by dividing the tamped density by the untamped density was 2.1.

The cross-sectional STEM-EDX analysis of particles of the positive electrode active material C7 revealed that the particles had a coating layer, and the ICP composition analysis and the powder X-ray diffraction pattern of a residual powder obtained by dissolving a powder of the positive electrode active material C7 in hydrochloric acid revealed that the positive electrode active material C7 was α-LiAlO₂.

The value of $D_{90}/D_{10}$ obtained from the particle size distribution measurement values of the positive electrode active material C7 was 4.8.

3. Discharge Rate Test of Lithium Secondary Battery

A coin-type battery was produced using the positive electrode active material C7, and a discharge rate test was carried out. As a result, the discharge capacity retention at 3CA was 57%.

Comparative Example 8

1. Production of Positive Electrode Active Material C8

An aqueous potassium hydroxide solution was added to a reaction vessel equipped with a stirrer.

An aqueous nickel sulfate solution and an aqueous cobalt sulfate solution were mixed together such that the atomic ratio of nickel atoms to cobalt atoms became 0.92:0.08, to thereby prepare a raw material mixture solution.

Then, the raw material mixture solution was continuously added to the reaction vessel with stirring, and an aqueous potassium hydroxide solution was dropwise added thereto at an appropriate timing such that the pH of the solution in the reaction vessel became 13.0, thereby obtaining nickel-cobalt composite hydroxide particles. The resulting particles were washed with water after filtration, and dried at 100° C., to thereby obtain a metal complex compound A8 in the form of dry powder. The BET specific surface area of the obtained metal complex compound A8 was 147 m²/g.

A lithium hydroxide powder and the metal complex compound A8 were weighed into a mortar such that Li/(Ni+Co)=1.03, followed by dry mixing in the mortar. The resulting was calcined in ambient atmosphere at 650° C. for 10 hours, thereby obtaining a lithium-containing composite metal oxide B8.

The results of the composition analysis of the lithium-containing composite metal oxide B8 revealed that the molar ratio of Li:Ni:Co was 1.03:0.92:0.08.

The lithium-containing composite metal oxide B8 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni and Co in the lithium-containing composite metal oxide B8, which means that the ratio of the atomic ratio of Al to the sum of the atomic ratios of Ni and Co is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C8.

2. Evaluation of Positive Electrode Active Material for Lithium Secondary Battery As a result of the powder X-ray diffraction (XRD) analysis of the obtained positive electrode active material C8, it was found that the crystal structure of the positive electrode active material C8 belonged to a space group of R-3m, and the intensity ratio of the (003) peak to the (104) peak in an XRD pattern was 1.2.

The primary particle diameter and the secondary particle diameter of the positive electrode active material C8 were respectively 0.3 μm and 34 μm.

The BET specific surface area of the positive electrode active material C8 was 1.7 m²/g.

The tamped density of the positive electrode active material C8 was 2.0 g/cm³, the untamped density of the positive electrode active material C8 was 0.93 g/cm³, and the value obtained by dividing the tamped density by the untamped density was 2.2.

The cross-sectional STEM-EDX analysis of particles of the positive electrode active material C8 revealed that the particles had a coating layer, and the ICP composition analysis and the powder X-ray diffraction pattern of a residual powder obtained by dissolving a powder of the positive electrode active material C8 in hydrochloric acid revealed that the positive electrode active material C8 was α-LiAlO₂.

The value of $D_{90}/D_{10}$ obtained from the particle size distribution measurement values of the positive electrode active material C8 was 18.

3. Discharge Rate Test of Lithium Secondary Battery

A coin-type battery was produced using the positive electrode active material C8, and a discharge rate test was carried out. As a result, the discharge capacity retention at 3CA was 30%.

Comparative Example 9

1. Production of Positive Electrode Active Material C9

An aqueous potassium hydroxide solution was added to a reaction vessel equipped with a stirrer.

An aqueous nickel sulfate solution, an aqueous cobalt sulfate solution and an aqueous manganese sulfate solution were mixed together such that the atomic ratio between nickel atoms, cobalt atoms and manganese atoms became 0.90:0.08:0.02, to thereby prepare a raw material mixture solution.

Then, the raw material mixture solution was continuously added to the reaction vessel with stirring, and an aqueous potassium hydroxide solution was dropwise added thereto at an appropriate timing such that the pH of the solution in the reaction vessel became 13.0, thereby obtaining nickel-cobalt-manganese composite hydroxide particles. The resulting particles were washed with water after filtration, and dried at 100° C., to thereby obtain a metal complex compound A9 in the form of dry powder. The BET specific surface area of the obtained metal complex compound A9 was 133 m$^2$/g.

A lithium hydroxide powder and the metal complex compound A9 were weighed into a mortar such that Li/(Ni+Co+Mn)=1.03, followed by dry mixing in the mortar. The resulting was calcined in ambient atmosphere at 650° C. for 10 hours, thereby obtaining a lithium-containing composite metal oxide B9.

The results of the composition analysis of the lithium-containing composite metal oxide B9 revealed that the molar ratio of Li:Ni:Co:Mn was 1.03:0.90:0.08:0.02.

The lithium-containing composite metal oxide B9 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni, Co and Mn in the lithium-containing composite metal oxide B9. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C9.

2. Evaluation of Positive Electrode Active Material for Lithium Secondary Battery As a result of the powder X-ray diffraction (XRD) analysis of the obtained positive electrode active material C9, it was found that the crystal structure of the positive electrode active material C9 belonged to a space group of R-3m, and the intensity ratio of the (003) peak to the (104) peak in an XRD pattern was 1.1.

The primary particle diameter and the secondary particle diameter of the positive electrode active material C9 were respectively 0.4 μm and 4 μm.

The BET specific surface area of the positive electrode active material C9 was 1.6 m$^2$/g.

The tamped density of the positive electrode active material C9 was 2.0 g/cm$^3$, the untamped density of the positive electrode active material C9 was 0.92 g/cm$^3$, and the value obtained by dividing the tamped density by the untamped density was 2.2.

The cross-sectional STEM-EDX analysis of particles of the positive electrode active material C9 revealed that the particles had a coating layer, and the ICP composition analysis and the powder X-ray diffraction pattern of a residual powder obtained by dissolving a powder of the positive electrode active material C9 in hydrochloric acid revealed that the positive electrode active material C9 was α-LiAlO$_2$.

The value of $D_{90}/D_{10}$ obtained from the particle size distribution measurement values of the positive electrode active material C9 was 5.0.

3. Discharge Rate Test of Lithium Secondary Battery

A coin-type battery was produced using the positive electrode active material C9, and a discharge rate test was carried out. As a result, the discharge capacity retention at 3CA was 29%.

Comparative Example 10

1. Production of Positive Electrode Active Material C10

An aqueous potassium hydroxide solution was added to a reaction vessel equipped with a stirrer.

An aqueous nickel sulfate solution and an aqueous cobalt sulfate solution were mixed together such that the atomic ratio of nickel atoms to cobalt atoms became 0.85:0.15, to thereby prepare a raw material mixture solution.

Then, the raw material mixture solution was continuously added to the reaction vessel with stirring, and an aqueous potassium hydroxide solution was dropwise added thereto at an appropriate timing such that the pH of the solution in the reaction vessel became 13.0, thereby obtaining nickel-cobalt composite hydroxide particles. The resulting particles were washed with water after filtration, and dried at 100° C., to thereby obtain a metal complex compound A10 in the form of dry powder. The BET specific surface area of the obtained metal complex compound A10 was 145 m$^2$/g.

A lithium hydroxide powder and the metal complex compound A10 were weighed into a mortar such that Li/(Ni+Co)=1.03, followed by dry mixing in the mortar. The resulting was calcined in ambient atmosphere at 900° C. for 10 hours, thereby obtaining a lithium-containing composite metal oxide B10.

The results of the composition analysis of the lithium-containing composite metal oxide B10 revealed that the molar ratio of Li:Ni:Co was 1.00:0.85:0.15.

The lithium-containing composite metal oxide B10 and an aluminum oxide were added to a mortar, followed by dry mixing in the mortar, thereby obtaining a powder mixture. The aluminum oxide was "Alumina C" manufactured by Nippon Aerosil Co., Ltd., which had an average primary particle diameter of 13 nm, and an Al content of 0.02 mol per 1 mol of Ni and Co in the lithium-containing composite metal oxide B10, which means that the ratio of the atomic ratio of Al to the sum of the atomic ratios of Ni and Co is 2 mol %. The resulting powder was allowed to stand in a thermo-hygrostat chamber regulated to a temperature of 60° C. and a relative humidity of 80% for 3 hours. The powder was further held in vacuo at room temperature for 1 hour, and then subjected to calcination in an oxygen atmosphere at 750° C. for 5 hours, to thereby obtain a positive electrode active material C10.

2. Evaluation of Positive Electrode Active Material for Lithium Secondary Battery As a result of the powder X-ray diffraction (XRD) analysis of the obtained positive electrode active material C10, it was found that the crystal structure of the positive electrode active material C10 belonged to a space group of R-3m, and the intensity ratio of the (003) peak to the (104) peak in an XRD pattern was 1.2.

The primary particle diameter and the secondary particle diameter of the positive electrode active material C10 were respectively 0.4 μm and 31 μm.

The BET specific surface area of the positive electrode active material C10 was 0.2 m$^2$/g.

The tamped density of the positive electrode active material C10 was 2.2 g/cm72 the untamped density of the positive electrode active material C10 was 1.7 g/cm$^3$, and the value obtained by dividing the tamped density by the untamped density was 1.3.

The cross-sectional STEM-EDX analysis of particles of the positive electrode active material C10 revealed that the particles had a coating layer, and the ICP composition analysis and the powder X-ray diffraction pattern of a residual powder obtained by dissolving a powder of the positive electrode active material C10 in hydrochloric acid revealed that the positive electrode active material C10 was α-LiAlO$_2$.

The value of D$_{90}$/D$_{10}$ obtained from the particle size distribution measurement values of the positive electrode active material C10 was 7.9.

3. Discharge Rate Test of Lithium Secondary Battery

A coin-type battery was produced using the positive electrode active material C10, and a discharge rate test was carried out. As a result, the discharge capacity retention at 3CA was 47%.

TABLE 1

| | Lithium-containing composite metal oxide | Coating layer | Average secondary particle diameter (μm) | BET specific surface area (m$^2$/g) | Tamped denstiy/untamped density | 3CA discharge capacity retention (%) |
|---|---|---|---|---|---|---|
| Ex. 1 | LiNi$_{0.92}$Co$_{0.08}$O$_2$ | α-LiAlO$_2$ | 11 | 0.5 | 1.6 | 76 |
| Ex. 2 | LiNi$_{0.9}$Co$_{0.08}$Mg$_{0.02}$O$_2$ | α-LiAlO$_2$ | 12 | 0.5 | 1.3 | 82 |
| Ex. 3 | LiNi$_{0.9}$Co$_{0.08}$Mn$_{0.02}$O$_2$ | α-LiAlO$_2$ | 10 | 0.3 | 1.5 | 76 |
| Ex. 4 | LiNi$_{0.9}$Co$_{0.08}$Al$_{0.02}$O$_2$ | α-LiAlO$_2$ | 13 | 0.6 | 1.4 | 78 |
| Ex. 5 | LiNi$_{0.9}$Co$_{0.08}$Zn$_{0.02}$O$_2$ | α-LiAlO$_2$ | 11 | 0.5 | 1.2 | 74 |
| Ex. 6 | LiNi$_{0.9}$Co$_{0.08}$Sn$_{0.02}$O$_2$ | α-LiAlO$_2$ | 10 | 0.5 | 1.2 | 74 |
| Comp. Ex. 1 | LiNi$_{0.92}$Co$_{0.08}$O$_2$ | — | 11 | 0.4 | 1.4 | 57 |
| Comp. Ex. 2 | LiNi$_{0.9}$Co$_{0.08}$Mg$_{0.02}$O$_2$ | — | 12 | 0.4 | 1.4 | 53 |
| Comp. Ex. 3 | LiNi$_{0.9}$Co$_{0.08}$Mn$_{0.02}$O$_2$ | — | 10 | 0.3 | 1.3 | 56 |
| Comp. Ex. 4 | LiNi$_{0.9}$Co$_{0.08}$Al$_{0.02}$O$_2$ | — | 14 | 0.4 | 1.4 | 35 |
| Comp. Ex. 5 | LiNi$_{0.9}$Co$_{0.08}$Zn$_{0.02}$O$_2$ | — | 12 | 0.5 | 1.3 | 32 |
| Comp. Ex. 6 | LiNi$_{0.9}$Co$_{0.08}$Sn$_{0.02}$O$_2$ | — | 10 | 0.4 | 1.4 | 59 |
| Comp. Ex. 7 | LiNiO$_2$ | α-LiAlO$_2$ | 18 | 1.6 | 2.1 | 57 |
| Comp. Ex. 8 | LiNi$_{0.92}$Co$_{0.08}$O$_2$ | α-LiAlO$_2$ | 34 | 1.7 | 2.2 | 30 |
| Comp. Ex. 9 | LiNi$_{0.9}$Co$_{0.08}$Mn$_{0.02}$O$_2$ | α-LiAlO$_2$ | 4 | 1.6 | 2.2 | 29 |
| Comp. Ex. 10 | LiNi$_{0.85}$Co$_{0.15}$O$_2$ | α-LiAlO$_2$ | 31 | 0.2 | 1.3 | 47 |

The results of the evaluation show that the lithium secondary battery of each of Examples 1 to 6 using the lithium-containing composite metal oxide having the coating layer as a positive electrode active material for a lithium secondary battery exhibited an increased 3CA discharge capacity retention, i.e., higher output, as compared to the lithium secondary battery of each of Comparative Examples 1 to 6 using the lithium-containing composite metal oxide without the coating layer as a positive electrode active material for a lithium secondary battery.

The lithium secondary battery in each of Examples 1 to 6 using the lithium-containing composite metal oxide satisfying the requirements of (1) to (3) as a positive electrode active material for a lithium secondary battery exhibited an increased 3CA discharge capacity retention, i.e., higher output, as compared to the lithium secondary battery of each of Comparative Examples 7 and 10 using the lithium-containing composite metal oxide not satisfying the requirement (1) as a positive electrode active material for a lithium secondary battery.

The lithium secondary battery in each of Examples 1 to 6 using the lithium-containing composite metal oxide satisfying the requirements of (1) to (3) as a positive electrode active material for a lithium secondary battery exhibited an increased 3CA discharge capacity retention, i.e., higher output, as compared to the lithium secondary battery of each of Comparative Examples 1 to 6 using the lithium-containing composite metal oxide not satisfying the requirement (2) as a positive electrode active material for a lithium secondary battery.

Similarly, the lithium secondary battery in each of Examples 1 to 6 using the lithium-containing composite metal oxide satisfying the requirements of (1) to (3) as a positive electrode active material for a lithium secondary battery exhibited an increased 3CA discharge capacity retention, i.e., higher output, as compared to the lithium secondary battery of each of Comparative Examples 7 to 10 using the lithium-containing composite metal oxide not satisfying the requirement (3) as a positive electrode active material for a lithium secondary battery.

DESCRIPTION OF THE REFERENCE SIGNS

1 Separator
2 Positive electrode
3 Negative electrode
4 Electrode group
5 Battery can
6 Electrolytic liquid
7 Top insulator
8 Sealing body
10 Lithium secondary battery
21 Positive electrode lead
31 Negative electrode lead

The invention claimed is:
1. A positive electrode active material powder for a lithium secondary battery, consisting of a lithium-containing composite metal oxide in a form of secondary particles formed by aggregation of primary particles capable of being doped and undoped with lithium ions, each of the secondary particles having on its surface a coating layer, the positive electrode active material powder satisfying the following requirements (1) to (3):
(1) the lithium-containing composite metal oxide has an α-NaFeO$_2$ type crystal structure represented by the following formula (A):

$$Li_a(Ni_bCo_cM^1{}_{1-b-c})O_2 \qquad (A)$$

wherein 0.9≤a≤1.2, 0.9≤b<1, 0<c≤0.1, 0.9<b+c≤1, and M$^1$ represents at least one metal selected from the group consisting of Mg, Al, Ca, Sc, Ti, V, Cr, Mn, Fe, Cu, Zn, Ga, Ge, Sr, Y, Zr, Nb, Mo, Tc, Ru, Rh, Pd, Ag, Cd, In and Sn;

(2) the coating layer consisting of a metal composite oxide of Li and $M^2$, wherein $M^2$ represents at least one metal selected from the group consisting of Al, Ti, Zr and W; and (3) the positive electrode active material powder having an average secondary particle diameter of 2 μm to 20 μm, a BET specific surface area of 0.1 m²/g to 2.5 m²/g, a value of 1.0 to 2.0 as a quotient of a tamped density of the positive electrode active material powder and an untamped density of the positive electrode active material powder, wherein the tamped density is a tapped bulk density in accordance with JIS R 1628:1997, and the untamped density is an initial stage bulk density in accordance with JIS R 1628:1997; and wherein a value of [diameter D90 of the positive electrode active material powder/diameter D10 of the positive electrode active material powder] is 1 to 3.

2. The positive electrode active material powder according to claim 1, wherein $M^1$ is at least one metal selected from the group consisting of Mg, Al, Ca, Ti, Mn, Zn, Ga, Zr and Sn.

3. The positive electrode active material powder according to claim 1, wherein $M^1$ is at least one metal selected from the group consisting of Mg, Al, Mn, Zn and Sn.

4. The positive electrode active material powder according to claim 1, wherein the tamped density is 1.0 g/cm³ to 3.5 g/cm³.

5. The positive electrode active material powder according to claim 1, wherein an atomic ratio of $M^2$ is 0.1 to 5 mol %, relative to a sum of atomic ratios of Ni, Co and $M^1$.

6. The positive electrode active material powder according to claim 1, wherein $M^2$ is Al.

7. The positive electrode active material powder according to claim 1, wherein the coating layer is formed of lithium aluminate.

8. The positive electrode active material powder according to claim 1, wherein an atomic ratio of $M^2$ is 0.1 to 3 mol %, relative to a sum of atomic ratios of Ni, Co and $M^1$.

* * * * *